US011032088B2

(12) United States Patent
Qiu

(10) Patent No.: US 11,032,088 B2
(45) Date of Patent: *Jun. 8, 2021

(54) DIGITAL CERTIFICATE MANAGEMENT METHOD, APPARATUS, AND SYSTEM

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 79 days.

This patent is subject to a terminal disclaimer.

(21) Appl. No.: 16/045,153

(22) Filed: Jul. 25, 2018

(65) Prior Publication Data

US 2019/0036712 A1  Jan. 31, 2019

(30) Foreign Application Priority Data

Jul. 26, 2017 (CN) .......................... 201710617598.2

(51) Int. Cl.
*H04L 29/06* (2006.01)
*H04L 9/32* (2006.01)
(Continued)

(52) U.S. Cl.
CPC ............ *H04L 9/3268* (2013.01); *G06F 9/542* (2013.01); *H04L 9/006* (2013.01); *H04L 9/0637* (2013.01);
(Continued)

(58) Field of Classification Search
CPC ........ G06F 21/31; G06F 21/445; G06F 21/73; G06F 9/542; H04L 2209/38;
(Continued)

(56) References Cited

U.S. PATENT DOCUMENTS 9,635,000 B1 * 4/2017 Muftic ..................... H04L 9/30
9,824,031 B1   11/2017 Ganti et al.
(Continued)

FOREIGN PATENT DOCUMENTS

CN          105701372       6/2016
CN          106301792       1/2017
(Continued)

OTHER PUBLICATIONS

PCT International Preliminary Report on Patentability in International Application No. PCT/US2018/043897, dated Sep. 24, 2019, 8 pages.
(Continued)

*Primary Examiner* — Joseph P Hirl
*Assistant Examiner* — Ka Shan Choy
(74) *Attorney, Agent, or Firm* — Fish & Richardson P.C.

(57) ABSTRACT

Techniques for providing a digital certificate management for blockchain technologies are described. One example method includes a transaction request including a digital certificate is received from a certificate authority at a node in a blockchain network, and the transaction request is a request to write the digital certificate into a blockchain associated with the blockchain network, and the digital certificate is issued to a node in the blockchain network. A consensus verification result is determined for the transaction request, and the consensus verification result is produced by nodes in the blockchain network. The consensus verification result is compared to a predetermined threshold value. In response to determining the consensus verification result is greater than or equal to the predetermined threshold value, the digital certificate is stored in the blockchain associated with the blockchain network.

20 Claims, 17 Drawing Sheets

(51) Int. Cl.
*G06F 9/54* (2006.01)
*H04L 9/00* (2006.01)
*H04L 9/06* (2006.01)
*H04L 29/08* (2006.01)

(52) U.S. Cl.
CPC ............ *H04L 9/3239* (2013.01); *H04L 63/12* (2013.01); *H04L 67/104* (2013.01); *H04L 2209/38* (2013.01); *H04L 2209/56* (2013.01)

(58) Field of Classification Search
CPC ... H04L 2209/56; H04L 63/12; H04L 67/104; H04L 9/006; H04L 9/0637; H04L 9/3239; H04L 9/3268; H04L 63/108
See application file for complete search history.

(56) References Cited

U.S. PATENT DOCUMENTS

| | | | |
|---|---|---|---|
| 10,250,395 B1* | 4/2019 | Borne-Pons | H04L 9/3255 |
| 2014/0351912 A1* | 11/2014 | Fu | H04L 9/3263 726/7 |
| 2016/0300234 A1* | 10/2016 | Moss-Pultz | G06F 21/10 |
| 2017/0116693 A1* | 4/2017 | Rae | G06Q 20/3827 |
| 2018/0096121 A1* | 4/2018 | Goeringer | H04L 9/3239 |
| 2018/0114218 A1* | 4/2018 | Konik | G06Q 20/065 |
| 2018/0204191 A1* | 7/2018 | Wilson | G06Q 20/4016 |
| 2018/0204213 A1 | 7/2018 | Zappier et al. | |
| 2018/0276666 A1 | 9/2018 | Haldenby | |
| 2019/0199535 A1* | 6/2019 | Falk | G06F 16/1824 |
| 2019/0244227 A1* | 8/2019 | Inoue | G06F 21/64 |
| 2019/0288854 A1 | 9/2019 | Xie et al. | |
| 2020/0127855 A1 | 4/2020 | Qiu | |

FOREIGN PATENT DOCUMENTS

| | | |
|---|---|---|
| CN | 106385315 | 2/2017 |
| CN | 106789089 | 5/2017 |
| CN | 106789090 | 5/2017 |
| CN | 106878000 | 6/2017 |
| KR | 101661930 | 10/2016 |
| KR | 101680260 | 11/2016 |
| KR | 101723405 | 4/2017 |
| KR | 101825320 | 3/2018 |
| TW | M543413 | 6/2017 |
| WO | WO 2017065389 | 4/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

CyberSecurityIntelligence.com [online], "Blockchain's Brilliant Approach to Cybersecurity," Feb. 2017, retrieved on Jun. 26, 2019, retrieved from URL<https://www.cybersecurityintelligence.com/blog/blockchains-brilliant-approach-to-cybersecurity-2155.html>, 4 pages.

Medium.com [Oneline], "Consensus in Blockchain Systems. In Short.," Jan. 2017, retrieved on Jun. 26, 2019, retrieved from URL<https://medium.com/@chrshmmmr/consensus-in-blockchain-systems-in-short-691fc7d1fefe>, 7 pages.

PCT Written Opinion of the International Preliminary Examining Authority in International Applciaiton No. PCT/US2018/043897, dated Jun. 26, 2019, 9 pages.

Kwon, Semanticscholar.org [online], "Tendermint: Consensus without Mining," Aug. 2014, retrieved on Jun. 26, 2019, retrieved from URL<https://www.semanticscholar.org/paper/Tendermint-%3A-Consensus-without-Mining-Kwon/df62a45f50aac8890453b6991ea115e996c1646e>, 11 pages.

U.S. Appl. No. 16/045,107, Qiu, filed Jul. 25, 2018.

U.S. Appl. No. 16/723,057, Qiu, filed Dec. 20, 2019.

Higashikaku et al., "A study on certificate management in consortium Chain", Symposium on Cryptography and Information Security pp. 1-4, 2017 (machine translation).

* cited by examiner

US 11,032,088 B2

DIGITAL CERTIFICATE MANAGEMENT METHOD, APPARATUS, AND SYSTEM

This application claims priority to Chinese Patent Application No. 201710617598.2, filed on Jul. 26, 2017, which is hereby incorporated by reference in its entirety.

TECHNICAL FIELD

The present application relates to the field of blockchain technologies, and in particular, to a digital certificate management method, apparatus, and system.

BACKGROUND

A blockchain technology is also referred to as a distributed ledger technology and is a decentralized distributed database technology. The blockchain technology is characterized by decentralization, transparency, tamper-resistance, and trust. Each piece of data in a blockchain can be broadcast to the blockchain nodes in an entire network. As such, each node has full, consistent data.

As the basis of decentralization, each node in the blockchain has a corresponding key pair. The validity of a public key in the key pair is verified by a certificate authority (CA). Referring to FIG. 1, the CA issues a digital certificate to a node 2, to prove that the node 2 legitimately has a public key listed in the digital certificate. In addition, when the node 2 initiates a transaction, the CA can remotely verify whether the digital certificate of the node 2 is valid.

However, the permission of the digital certificate of the node is easy to be randomly changed when the CA is hacked or when the CA works maliciously. Consequently, the security of the entire blockchain is affected.

SUMMARY

Implementations of the present application provide a digital certificate management method, apparatus, and system to resolve the problem in the existing technology, where the permission of a digital certificate of a node is often randomly changed when a CA is hacked or when the CA works maliciously.

An implementation of the present application provides a digital certificate management method, including the following: receiving a first transaction request sent by a certificate authority (CA), where the first transaction request is used for requesting to write a digital certificate issued by the CA to a node in a blockchain into the blockchain; determining a consensus result of consensus verification performed by the blockchain on the digital certificate; and responding to or rejecting the first transaction request based on the consensus result.

Optionally, determining a consensus result of consensus verification performed by the blockchain on the digital certificate includes the following: determining verification results of nodes in the blockchain that participate in consensus verification on the digital certificate; determining the number of first nodes and/or the number of second nodes in the nodes that participate in consensus verification, where the first node is a node whose verification result is "consensus verification succeeds", and the second node is a node whose verification result is "consensus verification fails"; and determining the consensus result based on the number of first nodes and/or the number of second nodes.

Optionally, determining verification results of nodes in the blockchain that participate in consensus verification on the digital certificate includes the following: determining an announcement published by the node after the node performs consensus verification on the digital certificate, where the announcement is used for broadcasting the transaction request and the verification result of the node to another node; and determining the verification results of the nodes that participate in consensus verification based on an announcement of each node.

Optionally, determining the consensus result based on the number of first nodes includes determining that the consensus verification on the digital certificate succeeds when the number of first nodes reaches a first predetermined threshold or when a proportion of the first nodes in the nodes that participate in consensus verification reaches a second predetermined threshold.

Optionally, responding to or rejecting the first transaction request based on the consensus result includes the following: responding to the first transaction request to write the digital certificate into the blockchain if the consensus result is "consensus verification succeeds"; or rejecting the first transaction request if the consensus result is "consensus verification fails".

An implementation of the present application provides a digital certificate management method, including the following: receiving a second transaction request sent by a certificate authority (CA), where the second transaction request is used for requesting to write a certificate revocation list into a blockchain, and the certificate revocation list is used for recording a revoked digital certificate; determining a consensus result of consensus verification performed by the blockchain on the certificate revocation list; and responding to or rejecting the second transaction request based on the consensus result.

Optionally, the method further includes the following: verifying a third transaction request in the blockchain based on the certificate revocation list, where the third transaction request is used for requesting to complete a transaction between a first node group and a second node group; and responding to or rejecting the third transaction request based on a verification result.

Optionally, verifying a third transaction request in the blockchain based on the certificate revocation list includes the following: comparing a digital certificate of a node in the first node group and the second node group with the revoked digital certificate recorded in the certificate revocation list; and determining the verification result based on a comparison result with reference to a predetermined transaction rule of the transaction.

Optionally, the method further includes the following: receiving a fourth transaction request sent by the CA, where the fourth transaction request is used for requesting to write update information of the certificate revocation list into the blockchain; determining a consensus result of consensus verification performed by the blockchain on the update information; and responding to or rejecting the fourth transaction request based on the consensus result.

An implementation of the present application provides a digital certificate management method, including the following: receiving a fifth transaction request sent by a certificate authority (CA), where the fifth transaction request is used for requesting to write a record of a digital certificate revoked by the CA into a blockchain; determining a consensus result of consensus verification performed by the blockchain on the record of the revoked digital certificate; and responding to or rejecting the fifth transaction request based on the consensus result.

Optionally, the method further includes constructing a certificate revocation list based on the record of the revoked digital certificate that is written into the blockchain, where the certificate revocation list is used for recording the revoked digital certificate.

An implementation of the present application provides a digital certificate management method, including the following: receiving an application request sent by a node in a blockchain, where the application request is used for requesting a certificate authority (CA) to issue a digital certificate to the node; issuing the digital certificate to the node in response to the application request; and sending a sixth transaction request to the blockchain, where the sixth transaction request is used for requesting to write the digital certificate into the blockchain. Thus, the blockchain performs consensus verification on the digital certificate and responds to or rejects the sixth transaction request based on a consensus result.

An implementation of the present application provides a digital certificate management apparatus, including the following: a receiving unit, configured to receive a first transaction request sent by a certificate authority (CA), where the first transaction request is used for requesting to write a digital certificate issued by the CA to a node in a blockchain into the blockchain; a determining unit, configured to determine a consensus result of consensus verification performed by the blockchain on the digital certificate; and a response unit, configured to respond to or reject the first transaction request based on the consensus result.

Optionally, the determining unit is configured to determine verification results of nodes in the blockchain that participate in consensus verification on the digital certificate; determine the number of first nodes and/or the number of second nodes in the nodes that participate in consensus verification, where the first node is a node whose verification result is "consensus verification succeeds", and the second node is a node whose verification result is "consensus verification fails"; and determine the consensus result based on the number of first nodes and/or the number of second nodes.

An implementation of the present application provides a digital certificate management apparatus, including a memory and a processor, where the memory is configured to store a program; and the processor is configured to execute the program stored in the memory, and specifically perform the following operations: receiving a first transaction request sent by a certificate authority (CA), where the first transaction request is used for requesting to write a digital certificate issued by the CA to a node in a blockchain into the blockchain; determining a consensus result of consensus verification performed by the blockchain on the digital certificate; and responding to or rejecting the first transaction request based on the consensus result.

An implementation of the present application provides a digital certificate management apparatus, including the following: a receiving unit, configured to receive a second transaction request sent by a certificate authority (CA), where the second transaction request is used for requesting to write a certificate revocation list into a blockchain, and the certificate revocation list is used for recording a revoked digital certificate; a determining unit, configured to determine a consensus result of consensus verification performed by the blockchain on the certificate revocation list; and a response unit, configured to respond to or reject the second transaction request based on the consensus result.

Optionally, the response unit is further configured to verify a third transaction request in the blockchain based on the certificate revocation list, where the third transaction request is used for requesting to complete a transaction between a first node group and a second node group; and respond to or reject the third transaction request based on a verification result.

Optionally, the response unit is further configured to compare a digital certificate of a node in the first node group and the second node group with the revoked digital certificate recorded in the certificate revocation list; and determine the verification result based on a comparison result with reference to a predetermined transaction rule of the transaction.

An implementation of the present application provides a digital certificate management apparatus, including the following: a receiving unit, configured to receive a fifth transaction request sent by a certificate authority (CA), where the fifth transaction request is used for requesting to write a record of a digital certificate revoked by the CA into a blockchain; a determining unit, configured to determine a consensus result of consensus verification performed by the blockchain on the record of the revoked digital certificate; and a response unit, configured to respond to or reject the fifth transaction request based on the consensus result.

Optionally, the response unit is further configured to construct a certificate revocation list based on the record of the revoked digital certificate that is written into the blockchain, where the certificate revocation list is used for recording the revoked digital certificate.

An implementation of the present application provides a digital certificate management apparatus, including the following: a receiving unit, configured to receive an application request sent by a node in a blockchain, where the application request is used for requesting a certificate authority (CA) to issue a digital certificate to the node; a response unit, configured to issue the digital certificate to the node in response to the application request; and a transaction unit, configured to send a sixth transaction request to the blockchain, where the sixth transaction request is used for requesting to write the digital certificate into the blockchain. Thus, the blockchain performs consensus verification on the digital certificate and responds to or rejects the sixth transaction request based on a consensus result.

An implementation of the present application provides a digital certificate management system, including at least one of the previous digital certificate management apparatus.

The implementations of the present application can use at least one of the previous technical solutions to achieve the following beneficial effects.

After the CA issues the digital certificate and before the digital certificate is chained, the blockchain performs consensus verification on the digital certificate, determines the validity of the digital certificate based on the verification result, and allows/refuses the digital certificate to be chained. Compared with a solution in the existing technology that a centralized CA is used to issue a certificate and directly chain the certificate, the decentralized CA can only issue the certificate and request to write the issued digital certificate into the blockchain in the implementations of the present application. In other words, the digital certificate issued by the CA is invalid before being chained. Therefore, even if the CA is faulty (for example, hacked) and is maliciously used to randomly issue a digital certificate, the security of the blockchain is not affected because the issued digital certificate is invalid. As such, in the implementations of the present application, when the CA is faulty, the entire blockchain can be effectively prevented from bearing a large security risk so as to improve the security of the blockchain.

BRIEF DESCRIPTION OF DRAWINGS

The accompanying drawings described here are intended to provide a further understanding of the present application and constitute a part of the present application. The illustrative implementations of the present application and descriptions of the implementations are intended to describe the present application and do not constitute limitations on the present application. In the accompanying drawings.

DESCRIPTION OF IMPLEMENTATIONS

To make the objectives, technical solutions, and advantages of the present application clearer, the following describes the technical solutions of the present application with reference to implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Implementation 1

Figure 1:
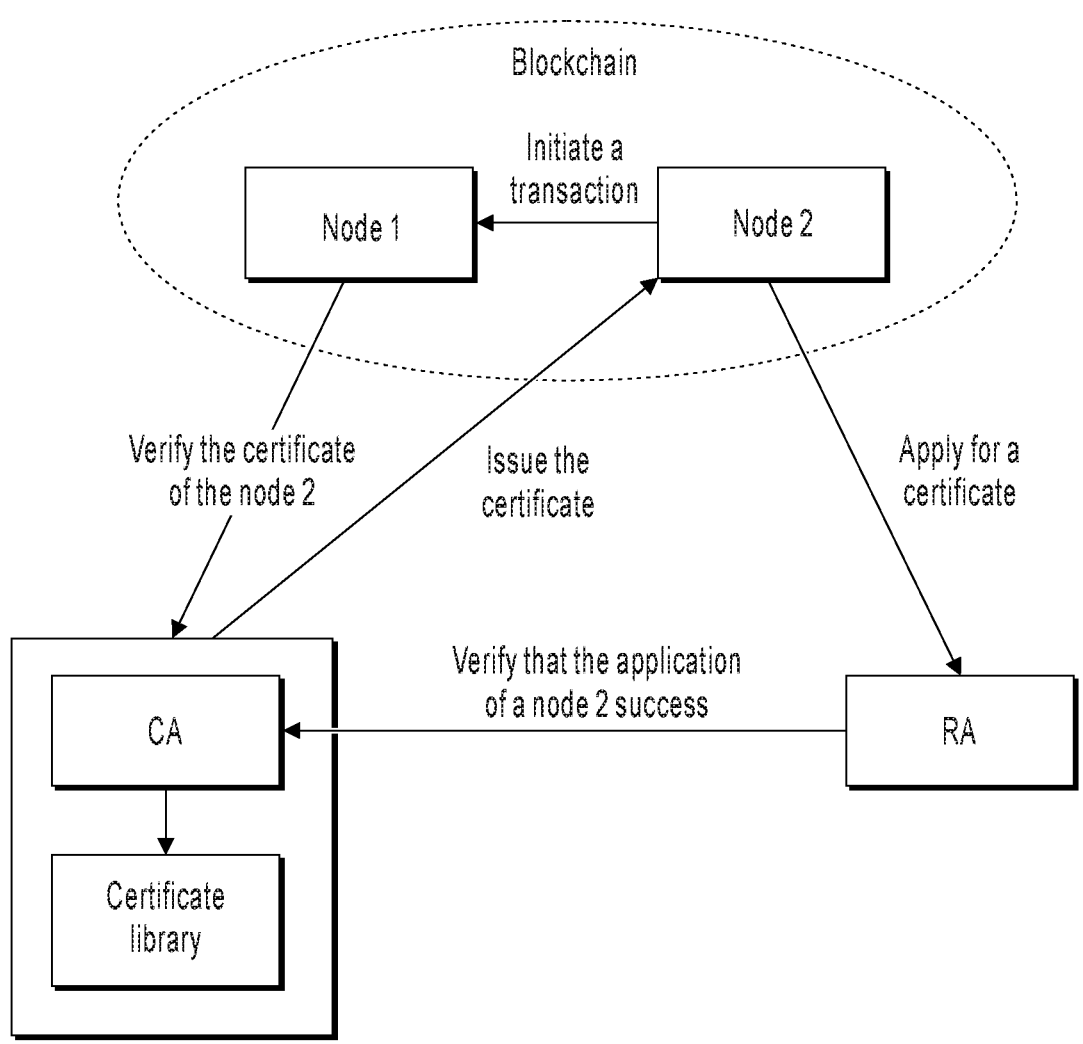
FIG. 1 is a schematic diagram illustrating a procedure that a CA system writes a digital certificate into a blockchain in the existing technology.
Figure 2:
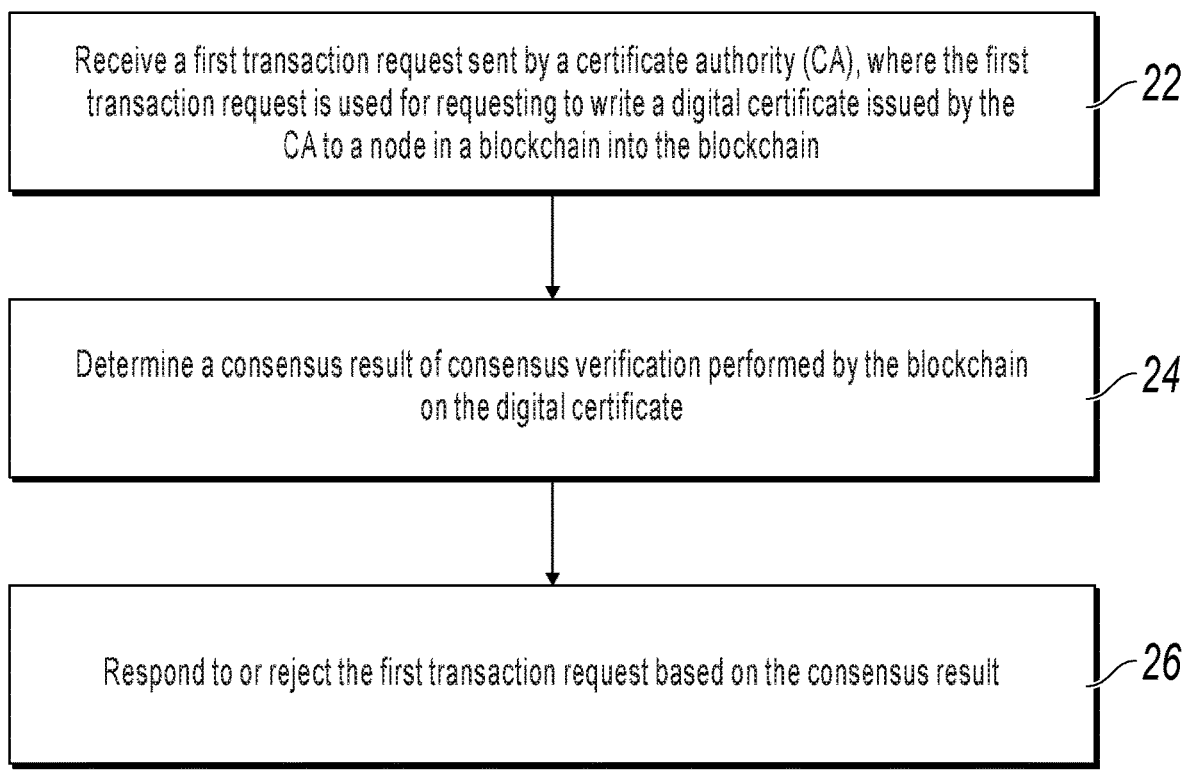
FIG. 2 is a schematic flowchart illustrating a digital certificate management method, according to Implementation 1 of the present application.

FIG. 2 is a schematic flowchart illustrating a digital certificate management method, according to this implementation of the present application. Referring to FIG. 2, the method specifically includes the following steps.

Step 22: Receive a first transaction request sent by a certificate authority (CA), where the first transaction request is used for requesting to write a digital certificate issued by the CA to a node in a blockchain into the blockchain.

Figure 3:
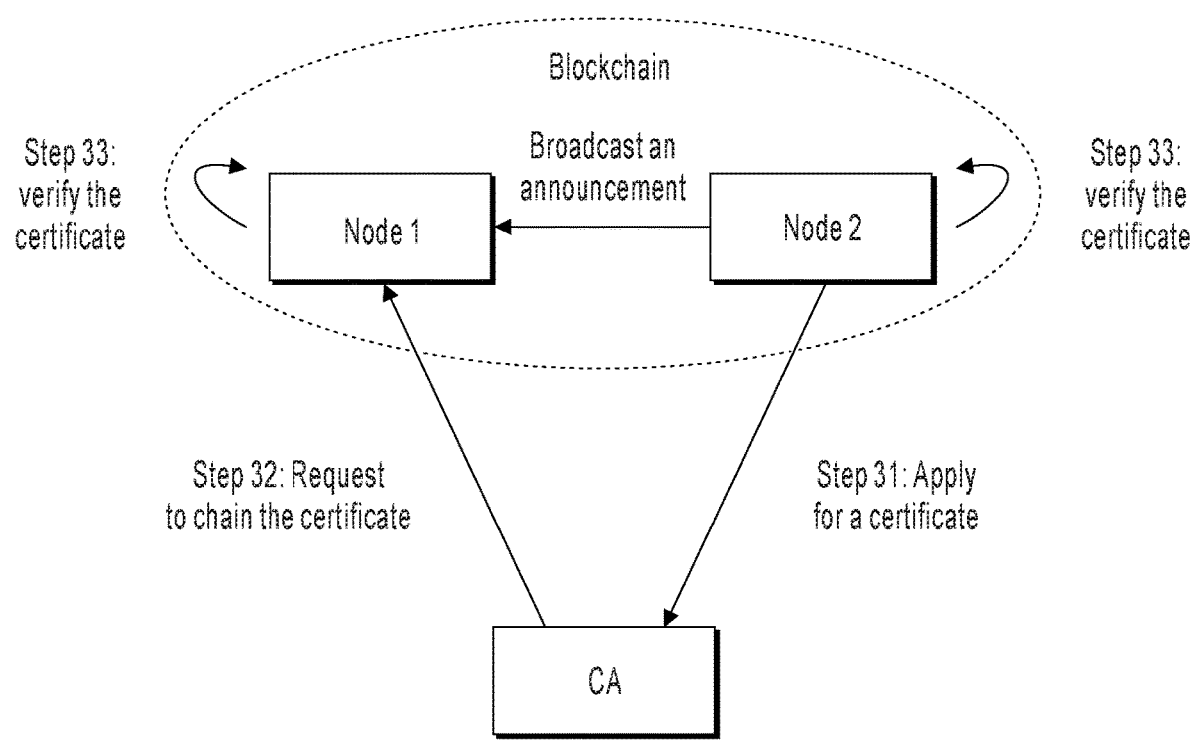
FIG. 3 is a schematic diagram illustrating a principle that a CA system writes a digital certificate into a blockchain, according to an implementation of the present application.

For example, with reference to FIG. 3, a node 2 in the blockchain applies to the CA for a digital certificate. The CA issues the digital certificate to the node 2, and requests to write the digital certificate of the node 2 into the blockchain by initiating the first transaction request.

The digital certificate can include a version, a serial number, a signature algorithm type, issuer information, a validity period, an issuer, an issued public key, a CA digital signature, other information, etc.

Step 24: Determine a consensus result of consensus verification performed by the blockchain on the digital certificate.

With reference to FIG. 3, after receiving the transaction request, the blockchain performs consensus verification on the digital certificate of the node 2. A verification criterion can be related to information in the digital certificate, for example, whether the validity period expires or whether the serial number satisfies a requirement. Alternatively, verification can be performed based on a customized criterion. For example, a customized character string A can be added to the digital certificate. The verification succeeds if the node detects that the character string A exists in the digital certificate. The verification fails if the character string A does not exist in the digital certificate.

Step 26: Respond to or reject the first transaction request based on the consensus result.

It is not difficult to understand that the blockchain responds to the first transaction request if the consensus result is "consensus verification succeeds", in other words, determines that the digital certificate is valid, and allows the digital certificate to be written into the blockchain. When a node (for example, the node 2 in FIG. 3) that applies for a certificate initiates a transaction, a digital certificate of the node can be normally used. The blockchain rejects the first transaction request if the consensus result is "consensus verification fails", in other words, considers that the digital certificate issued by the CA is invalid, and refuses the digital certificate to be chained.

It can be seen that, in this implementation of the present application, after the CA issues the digital certificate and before the digital certificate is chained, the blockchain performs consensus verification on the digital certificate, determines the validity of the digital certificate based on the verification result, and allows/refuses the digital certificate to be chained. Compared with a solution in the existing technology that a centralized CA is used to issue a certificate and directly chain the certificate, the decentralized CA can only issue the certificate and request to write the issued digital certificate into the blockchain in this implementation of the present application. In other words, the digital certificate issued by the CA is invalid before being chained. Therefore, even if the CA is faulty (for example, hacked) and is maliciously used to randomly issue a digital certificate, the security of the blockchain is not affected because the issued digital certificate is invalid. As such, in this implementation of the present application, when the CA is faulty, the entire blockchain can be effectively prevented from bearing a large security risk so as to improve the security of the blockchain.

Implementation 2

Figure 4:
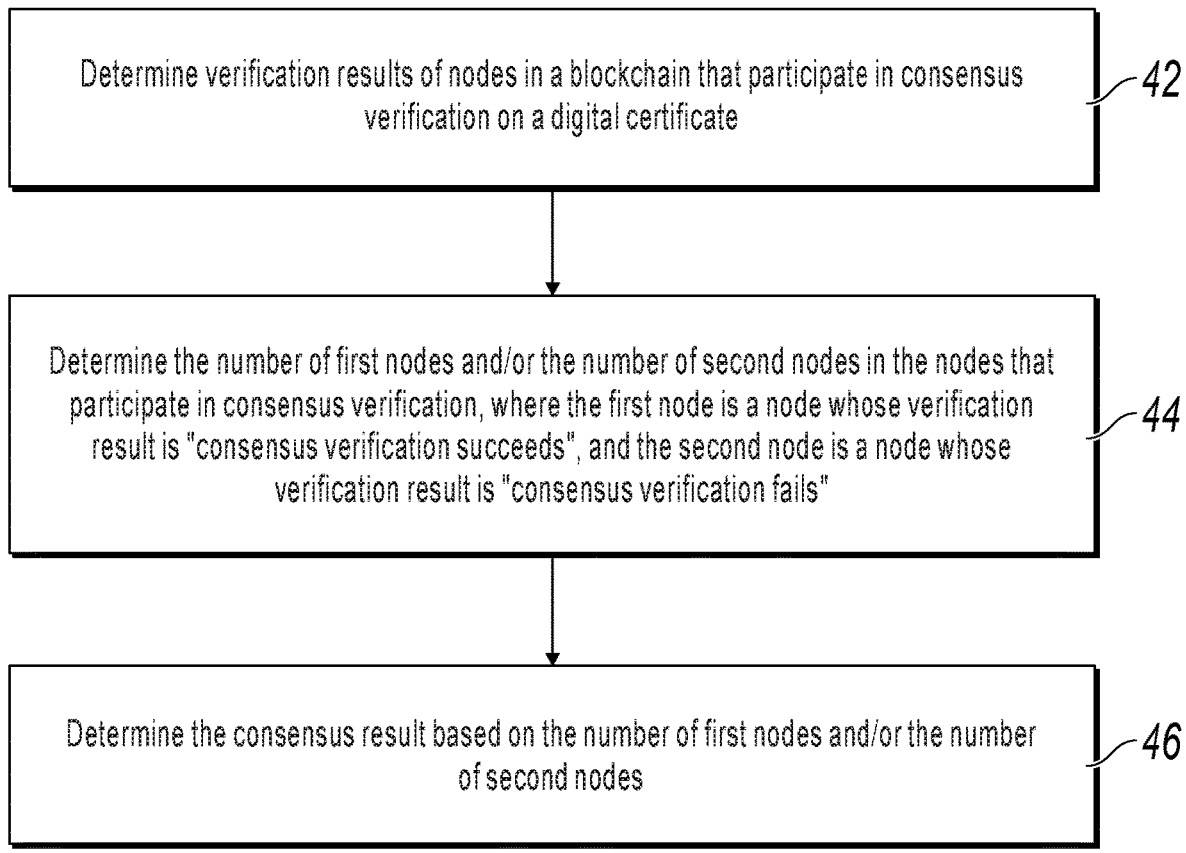
FIG. 4 is a schematic flowchart illustrating a consensus verification step in a digital certificate management method, according to Implementation 2 of the present application.

A difference between this implementation and Implementation 1 is that step 24 is further limited in this implementation. Referring to FIG. 4, the consensus verification in step 24 specifically includes the following steps.

Step 42: Determine verification results of nodes in the blockchain that participate in consensus verification on the digital certificate.

For example, with reference to FIG. 4, after the CA sends the digital certificate issued to the node 2 to the blockchain by using the first transaction request, the node in the blockchain verifies the digital certificate.

There is a relatively large network delay in a point-to-point network, and sequences of transactions observed by the nodes cannot be consistent. Therefore, a consensus mechanism needs to be predetermined to reach a consensus on the sequences of transactions occurring on the nodes.

Based on the predetermined consensus mechanism, the nodes in the blockchain sequentially perform consensus verification on the digital certificate. Each node broadcasts an announcement after completing consensus verification to notify another node of a verification result of the node and the transaction request of the CA. Then, the verification results of the nodes that participate in consensus verification are determined based on the announcement broadcast by each node. In addition, each node can sign the digital certificate when verifying the digital certificate to complete multiple signatures and authentication.

The predetermined consensus mechanism can be a proof of work mechanism, a proof of stake mechanism, etc.

Step 44: Determine the number of first nodes and/or the number of second nodes in the nodes that participate in consensus verification, where the first node is a node whose verification result is "consensus verification succeeds", and the second node is a node whose verification result is "consensus verification fails".

It is not difficult to understand that the nodes that participate in consensus verification are classified based on the verification results of the nodes that participate in consensus verification, to count the number of first nodes and the number of second nodes.

Step 46: Determine the consensus result based on the number of first nodes and/or the number of second nodes.

It should be noted that there are a plurality of methods for determining the consensus result. Examples are as follows:

Method 1: It is determined that the consensus verification on the digital certificate succeeds when the number of first nodes reaches a first predetermined threshold.

The first predetermined threshold can be equal to the sum of nodes in the blockchain or less than the sum of nodes in the blockchain, and it can be specifically determined according to a situation. If the first predetermined threshold is equal to the sum of nodes, it is determined that the consensus verification on the digital certificate fails when the number of second nodes is not equal to 0.

Method 2: First, the number of nodes that participate in consensus verification is set, for example, to 600, in other words, 600 nodes in the blockchain that are the first to complete consensus verification. Then, a proportion of the first nodes in the 600 nodes is determined in real time. It is determined that the consensus verification on the digital certificate succeeds when the proportion reaches a second predetermined threshold.

Method 3: First, duration of consensus verification is set, for example, to 2 s. Then, numbers of first nodes and second nodes that complete consensus verification within 2s are counted, and then a proportion of the first nodes/the second nodes is calculated. Whether the consensus verification on the digital certificate succeeds is determined based on the proportion or number of the first nodes/the second nodes.

It can be seen that, in this implementation of the present application, the verification result of each node is determined based on the verification result broadcast by the node after completing consensus verification so as to determine the reached consensus result. More than half or even all of the nodes in the blockchain participate in and complete the consensus verification process. Therefore, the consensus result is not affected unless most or even all of the nodes are hacked at the same time. As such, the security of the blockchain can be further improved in this implementation of the present application.

Implementation 3

Figure 5:
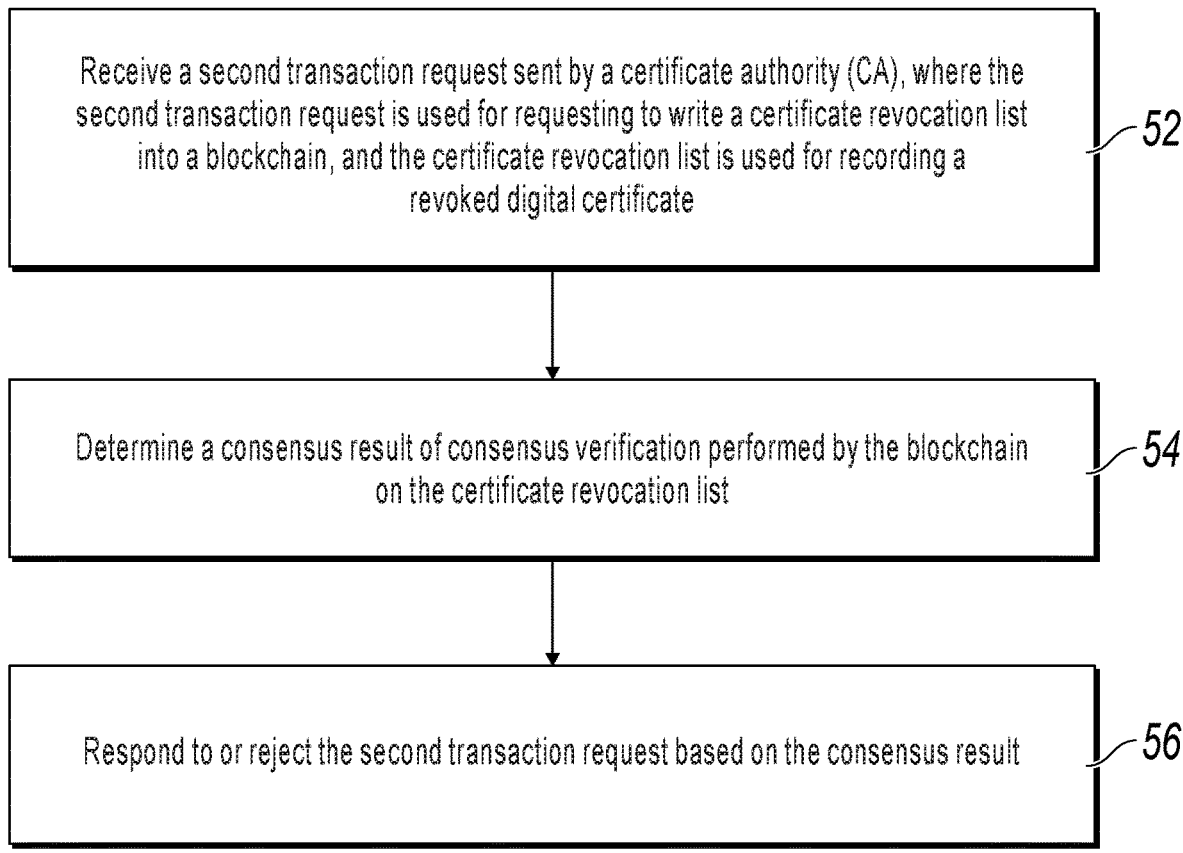
FIG. 5 is a schematic flowchart illustrating a digital certificate management method, according to Implementation 3 of the present application.

FIG. 5 is a schematic flowchart illustrating a digital certificate management method, according to Implementation 3 of the present application. Referring to FIG. 5, the method specifically includes the following steps.

Step 52: Receive a second transaction request sent by a certificate authority (CA), where the second transaction request is used for requesting to write a certificate revocation list into a blockchain, and the certificate revocation list is used for recording a revoked digital certificate.

Step 54: Determine a consensus result of consensus verification performed by the blockchain on the certificate revocation list.

Figure 6:
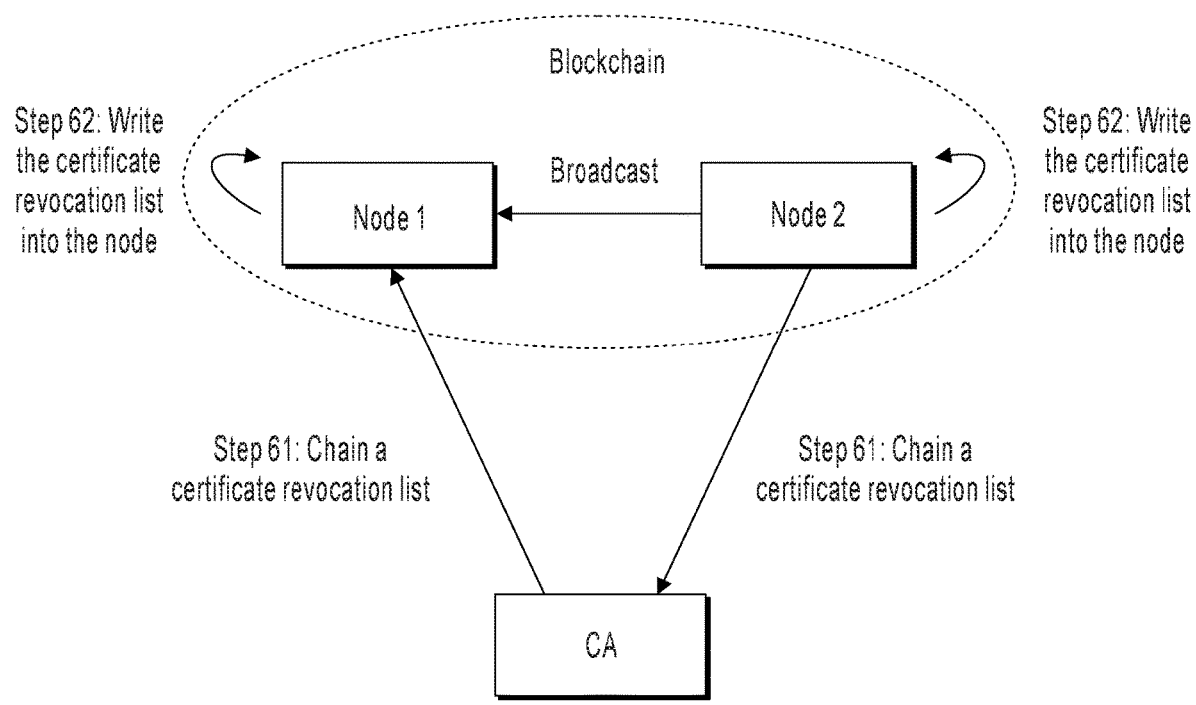
FIG. 6 is a schematic diagram illustrating a principle that a CA system writes a digital certificate into a blockchain, according to an implementation of the present application.

It should be noted that, with reference to FIG. 6, before the certificate revocation list is chained, the blockchain needs to perform consensus verification on the revocation list to prevent the certificate revocation list sent by the CA from being an incorrect certificate revocation list sent by the CA after the CA is hacked. For a verification method, refer to related content recorded in Implementation 1. It is not difficult to understand that a verification criterion of a digital certificate can be the same as or different from a verification criterion of the certificate revocation list. A customized verification method is used as an example. The two corresponding verification criteria can be a character string A each, or can be a character string A and a character string B respectively. This is not specifically limited here.

Step 56: Respond to or reject the second transaction request based on the consensus result.

It should be noted that after the consensus verification succeeds, the blockchain can synchronize the certificate revocation list to each node in the blockchain by using a peer network of the blockchain and a consensus algorithm. In other words, the blockchain broadcasts the certificate revocation list to each node. Then, each node can store the certificate revocation list in a local ledger.

Then, when a third transaction request occurs in the blockchain, the blockchain can verify the third transaction request in the blockchain based on the certificate revocation list in the local ledger to check the permission of digital certificates of both transaction parties, where the third transaction request is used for requesting to complete a transaction between a first node group and a second node group; and respond to or reject the third transaction request based on a verification result.

The first node group and the second node group include at least one node each. In addition, one node group is a transaction initiation node group, and the other node group is a transaction receiving node group.

With reference to FIG. 6, the following verification schemes are described by using an example that the node 2 is a transaction initiation node and the node 1 is a transaction receiving node.

Scheme 1: When the node 1 receives a transaction initiated by the node 2, the node 1 parses the transaction to obtain a digital certificate of the node 2, then extracts a certificate revocation list from a local ledger, and compares the digital certificate of the node 2 with each revoked digital certificate recorded in the certificate revocation list. If the digital certificate of the node 2 belongs to the certificate revocation list, the node 1 determines that the digital certificate of the node 2 has no related transaction permission, and rejects the transaction request initiated by the node 2. If the digital certificate of the node 2 has the related transaction permission, the node 1 responds to the transaction request initiated by the node 2, to complete the transaction between the two nodes and chain the transaction.

Scheme 2: The node 1 receives a transaction initiated by the node 2 and responds to the transaction after learning, through comparison, that verification on a digital certificate of the node 2 succeeds so as to feed back transaction data. The node 2 verifies a digital certificate of the node 1 that is carried in the transaction data fed back by the node 1; refuses the transaction if the verification fails; or completes the transaction and chains the transaction if the verification succeeds.

In addition, before initiating the transaction, the node 2 and the node 1 can first "handshake" to obtain the digital certificates of each other, then extract certificate revocation lists from their respective local ledgers, and verify the digital certificates of each other. The node 2 initiates the transaction if both verifications succeed.

It is not difficult to understand that transaction rules vary with transaction features. Therefore, there can be various kinds of verifications corresponding to results of comparison between the digital certificate in the certificate revocation list and those in the initiation node group and the transaction receiving node group. For example, the first type of transaction is as follows: A transaction initiator includes only a node A, and a transaction receiver includes a plurality of nodes. A transaction rule can be that all digital certificates of the nodes in both transaction parties need to have the transaction permission. A transaction can be performed as long as a digital certificate of the node A and a digital certificate of at least one node in the transaction receiver have the transaction permission. The node A can perform the transaction with the node that has the transaction permission in the transaction receiver.

A transaction rule can be determined based on user's needs, and is not limited here.

The transaction can include asset transfer information. The information includes an identity of a seller (transferor), an identity of a buyer (recipient), transaction assets or values, transaction time, and (or) a potential contract clause.

In this implementation, the revoked certificate can change. For example, if one or more digital certificates are added, the CA uses related information of the added revoked digital certificate as update information, and publishes the update information to the blockchain in a form of a fourth transaction request, to request to write the update information for the certificate revocation list into the blockchain. Then, the node in the blockchain performs consensus verification on the update information for a consensus result. Then, the node responds to the fourth transaction request based on the consensus result and writes the update information into the blockchain; or rejects the fourth transaction request based on the consensus result.

In addition, for a verification process, refer to related content recorded in the previous implementation. Details are not described here again.

The node in the blockchain adds the newly-added revoked digital certificate to the certificate revocation list.

It can be seen that, in this implementation, the certificate revocation list is published to the blockchain, so that when receiving the transaction request, the node directly reads the certificate revocation list from the local ledger and verifies whether the digital certificate of the transaction initiation node is a revoked digital certificate. Compared with a technical solution in the existing technology that a node sends a digital certificate of the transaction initiation node to the CA, and the CA verifies the permission of the digital certificate based on a stored revocation list, and returns a verification result to the node, there is no need to remotely request a verification service of the CA in this implementation of the present application. As such, digital certificate verification costs can be effectively reduced, and the transaction efficiency can be improved.

In addition, in this implementation of the present application, the node in the blockchain performs consensus verification on and signs the certificate revocation list before the certificate revocation list is chained, to verify the validity of the certificate revocation list, thereby avoiding an incorrect certificate revocation list sent by the CA after the CA is hacked. Moreover, the certificate revocation list is stored in the local ledger. Therefore, even if the CA is hacked, the following problem in the existing technical solution does not occur: The certificate revocation list is randomly modified because the CA is hacked; consequently, the permission of the digital certificate of the node is randomly revoked, and accordingly, transactions cannot be normally performed, or even the security of the entire blockchain is affected.

Implementation 4

Figure 7:
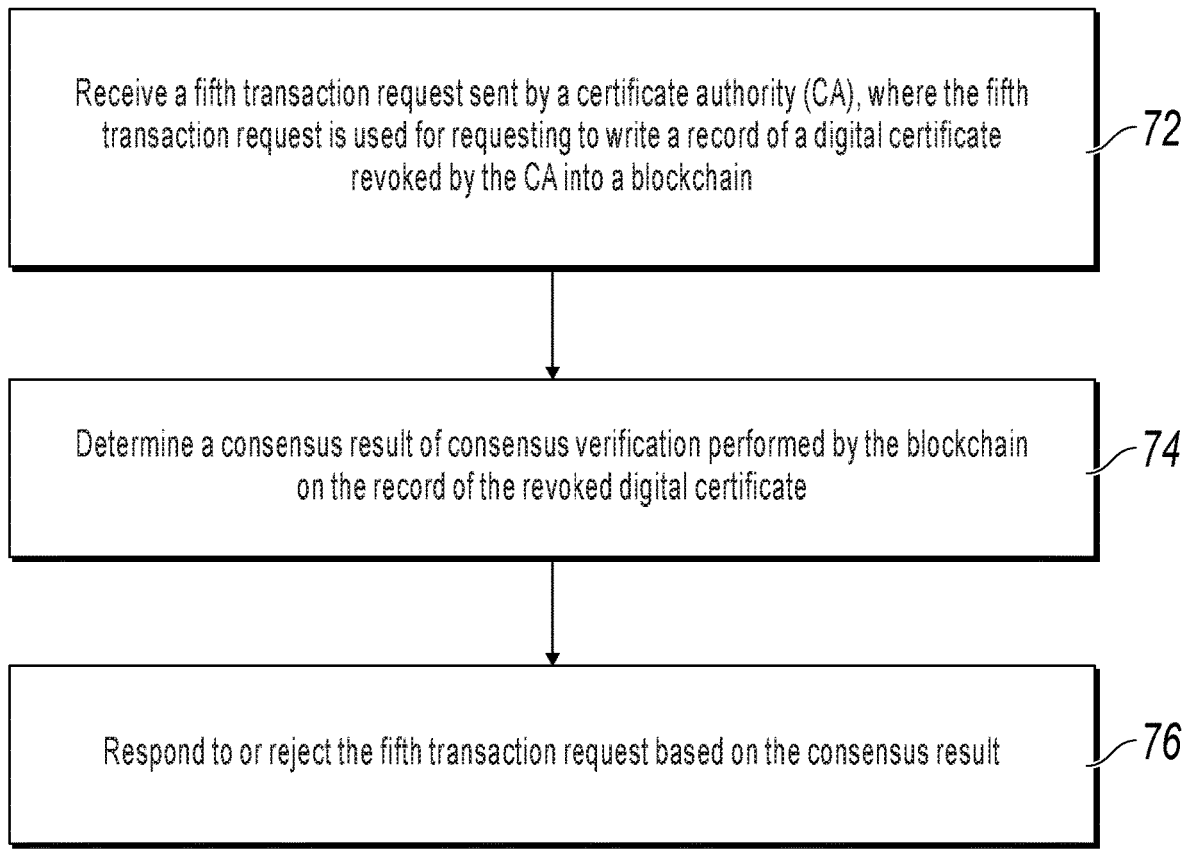
FIG. 7 is a schematic flowchart illustrating a digital certificate management method, according to Implementation 4 of the present application.

FIG. 7 is a schematic flowchart illustrating a digital certificate management method, according to Implementation 4 of the present application. Referring to FIG. 7, the method includes the following steps:

72. Receive a fifth transaction request sent by a certificate authority (CA), where the fifth transaction request is used for requesting to write a record of a digital certificate revoked by the CA into a blockchain.

74. Determine a consensus result of consensus verification performed by the blockchain on the record of the revoked digital certificate.

76. Respond to or reject the fifth transaction request based on the consensus result.

The blockchain rejects the fifth transaction request if the consensus verification on the record fails. The blockchain responds to the fifth transaction request if the consensus verification on the record succeeds, and constructs a certificate revocation list based on the record of the revoked digital certificate that is written into the blockchain. The certificate revocation list is used for recording the revoked digital certificate.

Then, a record subsequently written into the blockchain is used as update data to update the certificate revocation list.

It is not difficult to understand that the record is broadcast to each node after being written into the blockchain. Therefore, each node constructs a certificate revocation list in a local ledger.

It should be noted that this implementation is similar to Implementation 3. Therefore, for a record verification method, verification performed on the permission of a digital certificate of a transaction participating node by using the certificate revocation list, etc., refer to related records in Implementation 3.

It can be seen that in this implementation, the CA can only issue a certificate, revoke a certificate, etc., and construction, storage, and maintenance of the certificate revocation list are completed by the nodes in the blockchain. Therefore, when receiving the transaction request, the node can directly read the certificate revocation list from the local ledger, and verify whether a digital certificate of a transaction initiation node is a revoked digital certificate. Compared with a technical solution in the existing technology that a node sends a digital certificate of the transaction initiation node to the CA, and the CA verifies the permission of the digital certificate based on a stored revocation list, and returns a verification result to the node, there is no need to remotely request a verification service of the CA in this implementation of the present application. As such, digital certificate verification costs can be effectively reduced, and the transaction efficiency can be improved.

Implementation 5

Figure 8:
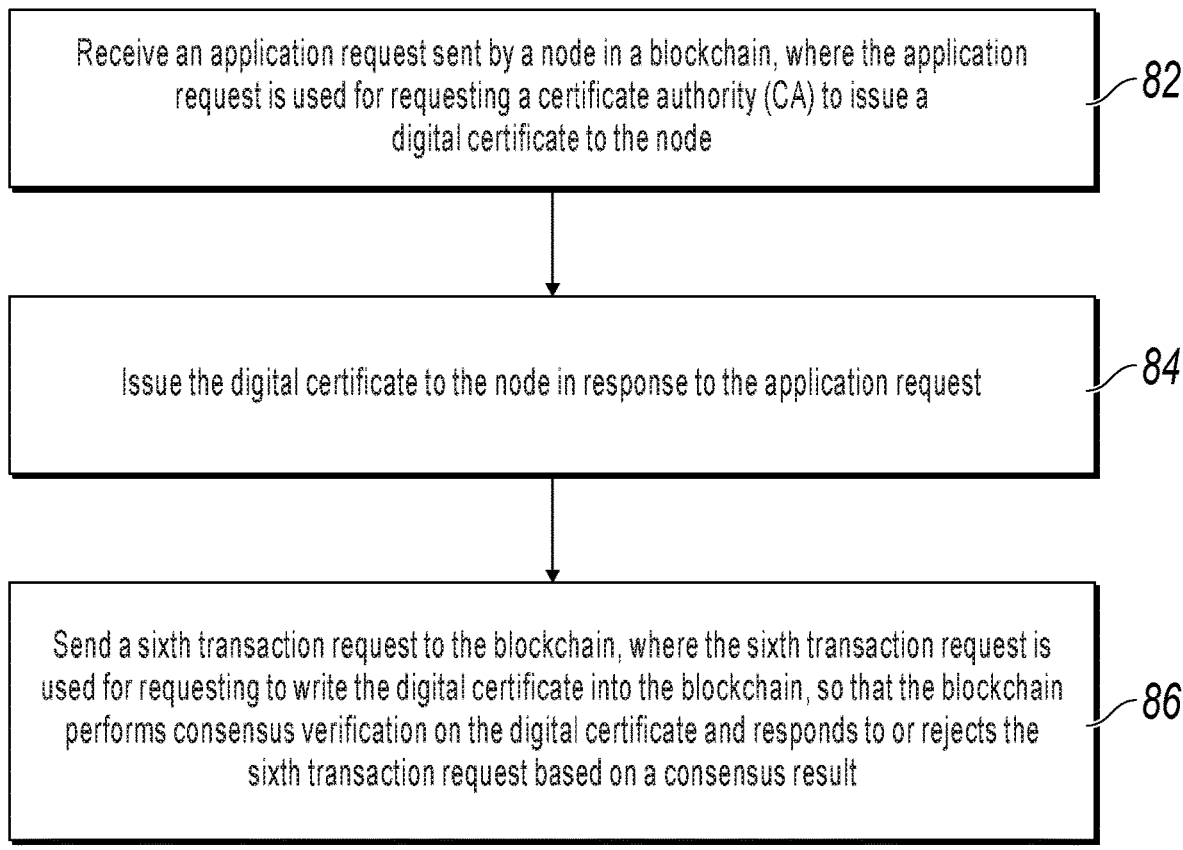
FIG. 8 is a schematic flowchart illustrating a digital certificate management method, according to Implementation 5 of the present application.

FIG. 8 is a schematic flowchart illustrating a digital certificate management method, according to Implementation 5 of the present application. Referring to FIG. 8, this implementation is executed by a CA, and the method specifically includes the following steps:

82. Receive an application request sent by a node in a blockchain, where the application request is used for requesting the certificate authority (CA) to issue a digital certificate to the node.

84. Issue the digital certificate to the node in response to the application request.

86. Send a sixth transaction request to the blockchain, where the sixth transaction request is used for requesting to write the digital certificate into the blockchain, so that the blockchain performs consensus verification on the digital certificate and responds to or rejects the sixth transaction request based on a consensus result.

With reference to FIG. 3, for example, a node 2 sends a certificate application request to the CA. The request includes related information of the node 2, for example, an identifier of the node 2. The CA then verifies the related information of the node 2, issues a digital certificate to the node 2 if the verification succeeds, and initiates a request for writing the digital certificate of the node 2 into the blockchain.

Because this implementation and the previous implementations correspond to each other, some steps are not described in detail again. For details, refer to the corresponding parts in the previous implementations.

It can be seen that, in this implementation of the present application, after issuing the digital certificate to the node, the CA requests the blockchain to chain the digital certificate. The blockchain verifies the validity of the digital certificate and determines whether to chain the digital certificate. Compared with a solution in the existing technology that the CA issues a digital certificate to a node and directly writes the digital certificate into a blockchain for chaining, the CA in this implementation of the present application cannot perform centralized certificate management, certificate storage, and certificate chaining, and can only issue the digital certificate. As such, the risk that the CA is attacked can be reduced, and the CA stability and security can be improved.

To make the description brief, the previous method implementations are expressed as a combination of a series of actions. However, a person skilled in the art should appreciate that the implementations of the present disclosure are not limited to the described action sequence because some steps can be performed in other sequences or performed simultaneously according to the implementations of the present disclosure. In addition, a person skilled in the art should also appreciate that all the implementations described in the specification are examples of implementations, and the actions mentioned are not necessarily mandatory to the implementations of the present disclosure.

Implementation 6

Figure 9:
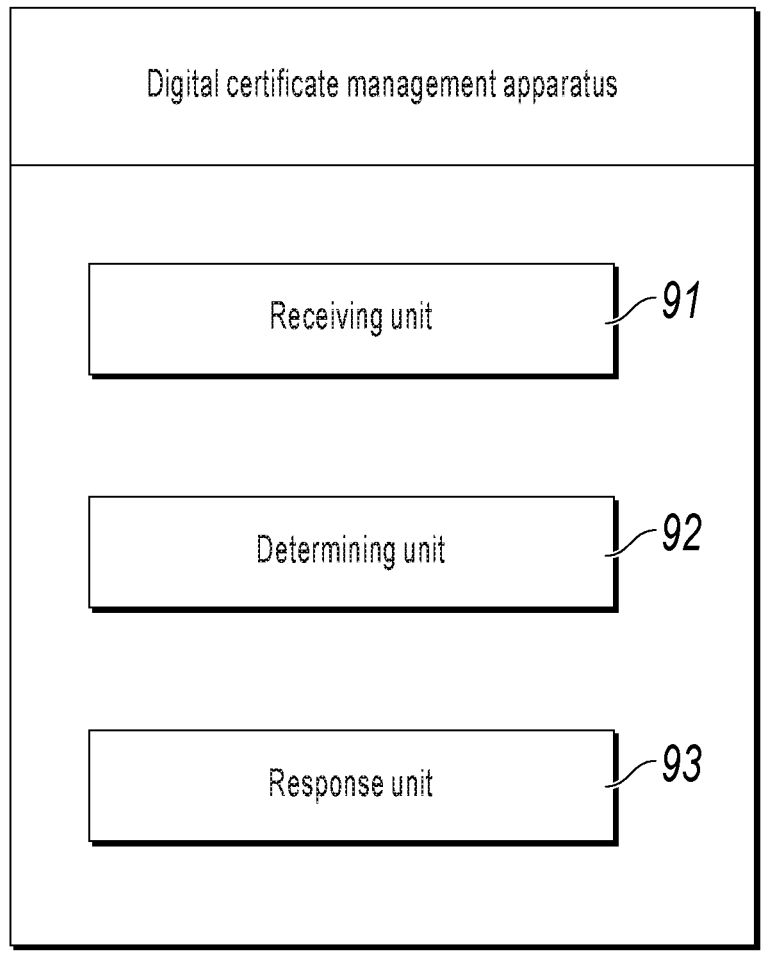
FIG. 9 is a schematic structural diagram illustrating a digital certificate management apparatus, according to Implementation 6 of the present application.

FIG. 9 is a schematic structural diagram illustrating a digital certificate management apparatus, according to Implementation 6 of the present application. Referring to FIG. 9, the apparatus includes a receiving unit 91, a determining unit 92, and a response unit 93.

The receiving unit 91 is configured to receive a first transaction request sent by a certificate authority (CA), where the first transaction request is used for requesting to write a digital certificate issued by the CA to a node in a blockchain into the blockchain.

The determining unit 92 is configured to determine a consensus result of consensus verification performed by the blockchain on the digital certificate.

The response unit 93 is configured to respond to or reject the first transaction request based on the consensus result.

With reference to FIG. 3, for example, a node 2 sends a certificate application request to the CA. The CA responds to the request of the node 2, issues a digital certificate to the node 2, and requests, in a form of a transaction, to chain the issued digital certificate. The receiving unit 91 receives the transaction request sent by the CA, and forwards the transaction request to the determining unit 92. The determining unit 92 determines a consensus result of consensus verification performed by the blockchain on the digital certificate, to determine the validity of the digital certificate. Then, the determining unit 92 sends the determined consensus result to the response unit 93. The response unit 93 analyzes the consensus result; and responds to the transaction request of the CA and allows the digital certificate to be chained if learning, through the analysis, that the consensus result is "verification succeeds"; or rejects the transaction request of the CA and refuses the digital certificate to be chained if learning, through the analysis, that the consensus result is "verification fails".

In this implementation, a consensus verification principle of the determining unit 92 includes:

Verification results of nodes in the blockchain that participate in consensus verification on the digital certificate are determined. Preferably, an announcement published by the node after the node performs consensus verification on the digital certificate is determined. The announcement is used for broadcasting the transaction request and the verification result of the node to another node. The verification results of all the nodes that participate in consensus verification are determined based on an announcement of each node.

The number of first nodes in all the nodes that participate in consensus verification is determined. The first node is a node whose verification result is "consensus verification succeeds".

The consensus result is determined based on the number of first nodes. Preferably, it is determined that the consensus verification on the digital certificate succeeds when the number of first nodes reaches a first predetermined threshold or when a proportion of the first nodes in all the nodes that participate in consensus verification reaches a second predetermined threshold.

It can be seen that, in this implementation of the present application, after the CA issues the digital certificate and before the digital certificate is chained, the blockchain performs consensus verification on the digital certificate, determines the validity of the digital certificate based on the verification result, and allows/refuses the digital certificate to be chained. Compared with a solution in the existing technology that a centralized CA is used to issue a certificate and directly chain the certificate, the decentralized CA can only issue the certificate and request to write the issued digital certificate into the blockchain in this implementation of the present application. In other words, the digital certificate issued by the CA is invalid before being chained. Therefore, even if the CA is faulty (for example, hacked) and is maliciously used to randomly issue a digital certificate, the security of the blockchain is not affected because the issued digital certificate is invalid. As such, in this implementation of the present application, when the CA is faulty, the entire blockchain can be effectively prevented from bearing a large security risk so as to improve the security of the blockchain.

Implementation 7

Figure 10:
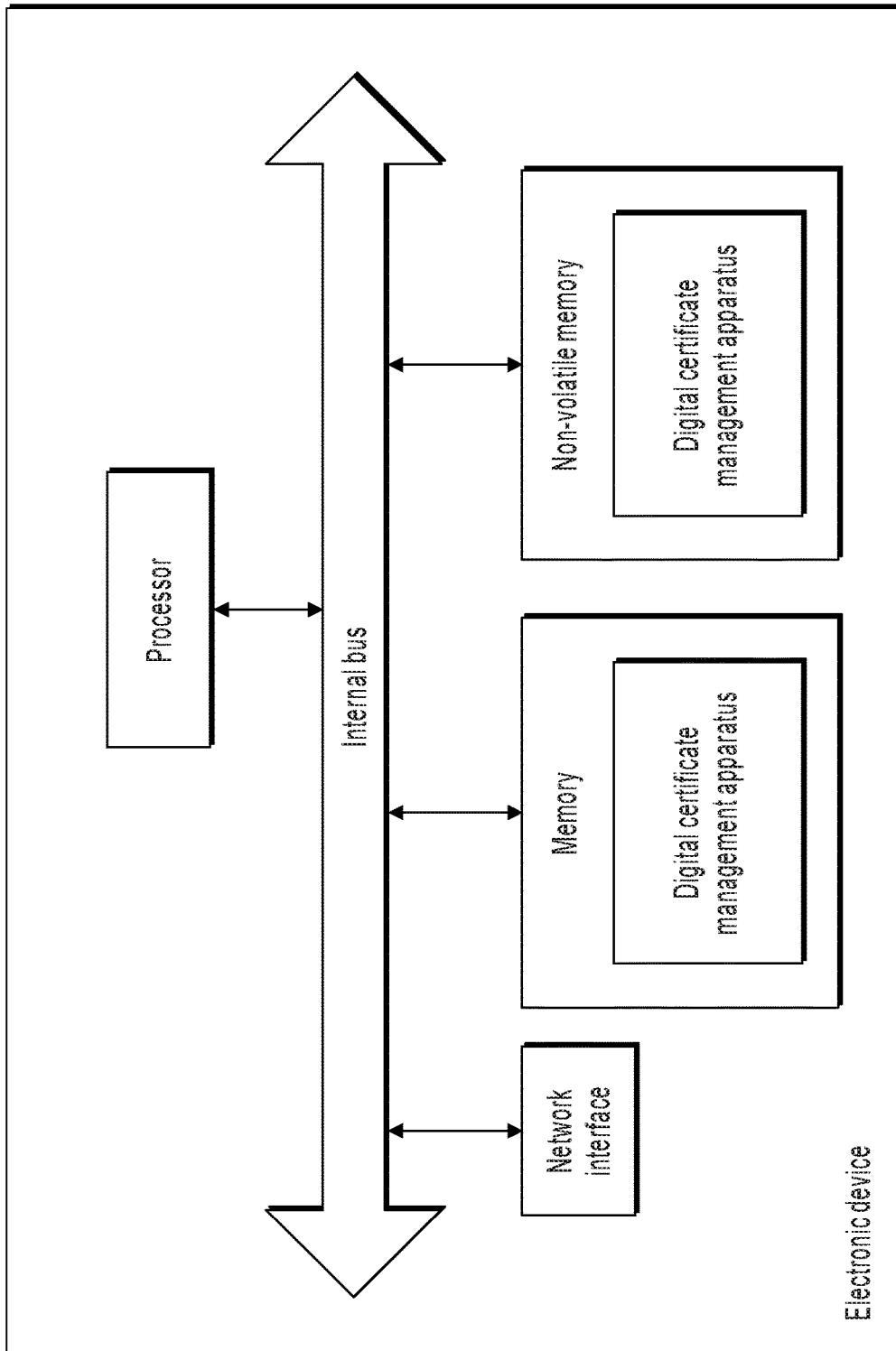
FIG. 10 is a schematic structural diagram illustrating an electronic device, according to Implementation 7 of the present application.

FIG. 10 is a schematic structural diagram illustrating an electronic device, according to Implementation 7 of the present application. Referring to FIG. 10, from a perspective of hardware, the electronic device includes a processor, an internal bus, a network interface, a memory, and a non-volatile memory, and certainly can further include hardware needed by another service. The processor reads a corresponding computer program from the non-volatile memory to the memory, and then runs the computer program to form the digital certificate management apparatus at a logical level. Certainly, in addition to a software implementation, the present application does not exclude another implementation, for example, a logic device or a combination of hardware and software. In other words, an execution body of the following processing procedure is not limited to logical units, and can also be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of indication, in FIG. 10, the bus is indicated by using only one double-headed arrow. However, it does not mean that there is only one bus or only one type of bus.

The memory is configured to store a program. Specifically, the program can include program code, and the program code includes a computer operation instruction. The memory can include a read-only memory and a random access memory, and provides an instruction and data for the processor. The memory can include a high-speed random access memory (RAM), and can further include a non-volatile memory (non-volatile memory) such as at least one magnetic disk memory.

The processor is configured to execute the program stored in the memory, and specifically perform the following operations: receiving a first transaction request sent by a certificate authority (CA), where the first transaction request is used for requesting to write a digital certificate issued by the CA to a node in a blockchain into the blockchain; determining a consensus result of consensus verification performed by the blockchain on the digital certificate; and responding to or rejecting the first transaction request based on the consensus result.

The previous method performed by the digital certificate management apparatus or a master (Master) node and disclosed in the implementations shown in FIG. 2, FIG. 4, and FIG. 9 of the present application can be applied to the processor or implemented by the processor. The processor can be an integrated circuit chip and has a signal processing capability. In an implementation process, the steps in the previous methods can be implemented by using an integrated logic circuit of hardware in the processor or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or another programmable logic device, a discrete gate or transistor logic device, or a discrete hardware component; and can implement or perform methods, steps, and logical block diagrams disclosed in the implementations of the present application. The general-purpose processor can be a microprocessor, or the processor can be any conventional processor, etc. Steps of the methods disclosed with reference to the implementations of the present application can be directly executed and completed by using a hardware decoding processor or a combination of hardware and software modules in the decoding processor. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previous methods in combination with hardware of the processor.

The digital certificate management apparatus can further perform the method in FIG. 2 and implement a method performed by the master node.

Implementation 8

Figure 11:
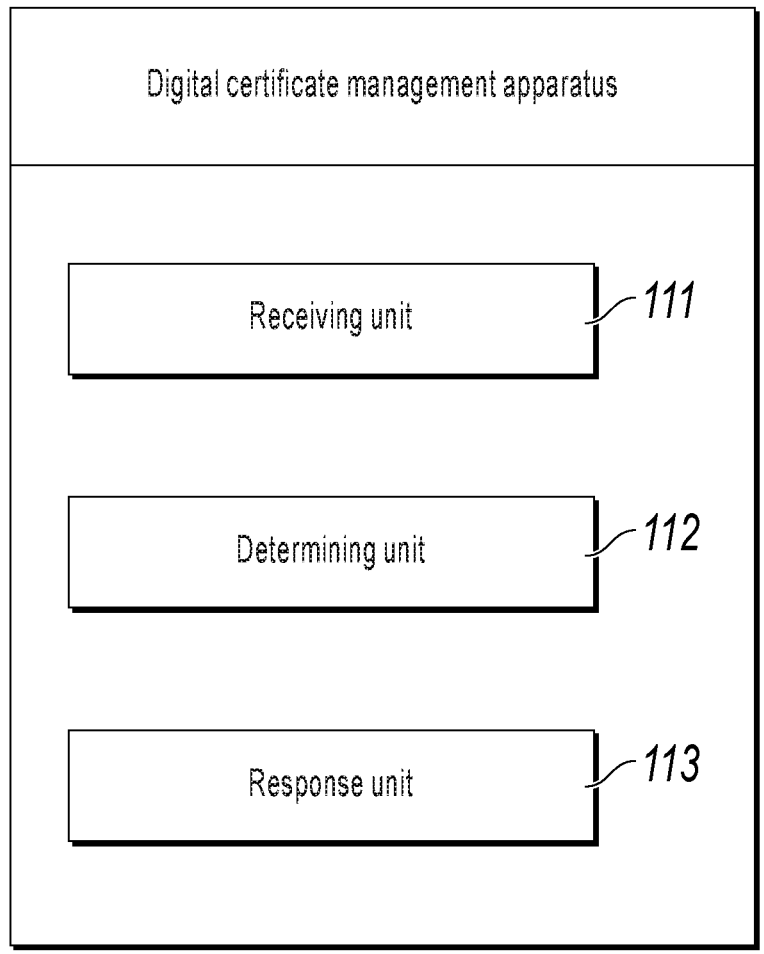
FIG. 11 is a schematic structural diagram illustrating a digital certificate management apparatus, according to Implementation 8 of the present application.

FIG. 11 is a schematic structural diagram illustrating a digital certificate management apparatus, according to Implementation 8 of the present application. Referring to FIG. 11, the apparatus includes a receiving unit 111, a determining unit 112, and a response unit 113.

The receiving unit 111 is configured to receive a second transaction request sent by a certificate authority (CA), where the second transaction request is used for requesting to write a certificate revocation list into a blockchain, and the certificate revocation list is used for recording a revoked digital certificate.

The determining unit 112 is configured to determine a consensus result of consensus verification performed by the blockchain on the certificate revocation list.

The response unit 113 is configured to respond to or reject the second transaction request based on the consensus result.

It should be noted that, after the current blockchain-CA system is upgraded, the CA publishes a currently maintained certificate revocation list to the blockchain. Consensus verification is performed on the certificate revocation list after the receiving unit 111 receives the certificate revocation list. The determining unit 112 determines a consensus result, and sends the consensus result to the response unit 113. The response unit 113 allows chaining if the response unit 113 learns that the verification succeeds, or refuses chaining if the verification fails.

In addition, the chaining can be specifically storing the digital certificate list in a local ledger of each node. Then, when a node receives a third transaction request, the response unit 113 verifies the third transaction request based on a certificate revocation list stored in a local ledger, and then responds to or rejects the third transaction request based on a verification result. The third transaction request is used for requesting to complete a transaction between a first node group and a second node group.

In this implementation, a work principle of the response unit 113 is as follows:

A digital certificate of a node in the first node group and the second node group is compared with the revoked digital certificate recorded in the certificate revocation list. The verification result is determined based on a comparison result with reference to a predetermined transaction rule of the transaction.

In this implementation, the apparatus further includes an update unit, configured to receive a fourth transaction request sent by the CA, where the fourth transaction request is used for requesting to write update information of the certificate revocation list into the blockchain; determine a consensus result of consensus verification performed by the blockchain on the update information; and respond to or reject the fourth transaction request based on the consensus result.

It can be seen that in this implementation, the certificate revocation list is published to the blockchain, so that when receiving a transaction initiated by a transaction initiation node, a node directly reads the certificate revocation list from a local ledger and verifies the permission of a digital certificate of the transaction initiation node. There is no need to remotely invoke a verification service of the CA. As such, verification costs can be effectively reduced, and the verification efficiency can be improved. Moreover, because the certificate revocation list is stored in the local ledger, no serious consequence occurs even if the CA is hacked.

Implementation 9

Figure 12:
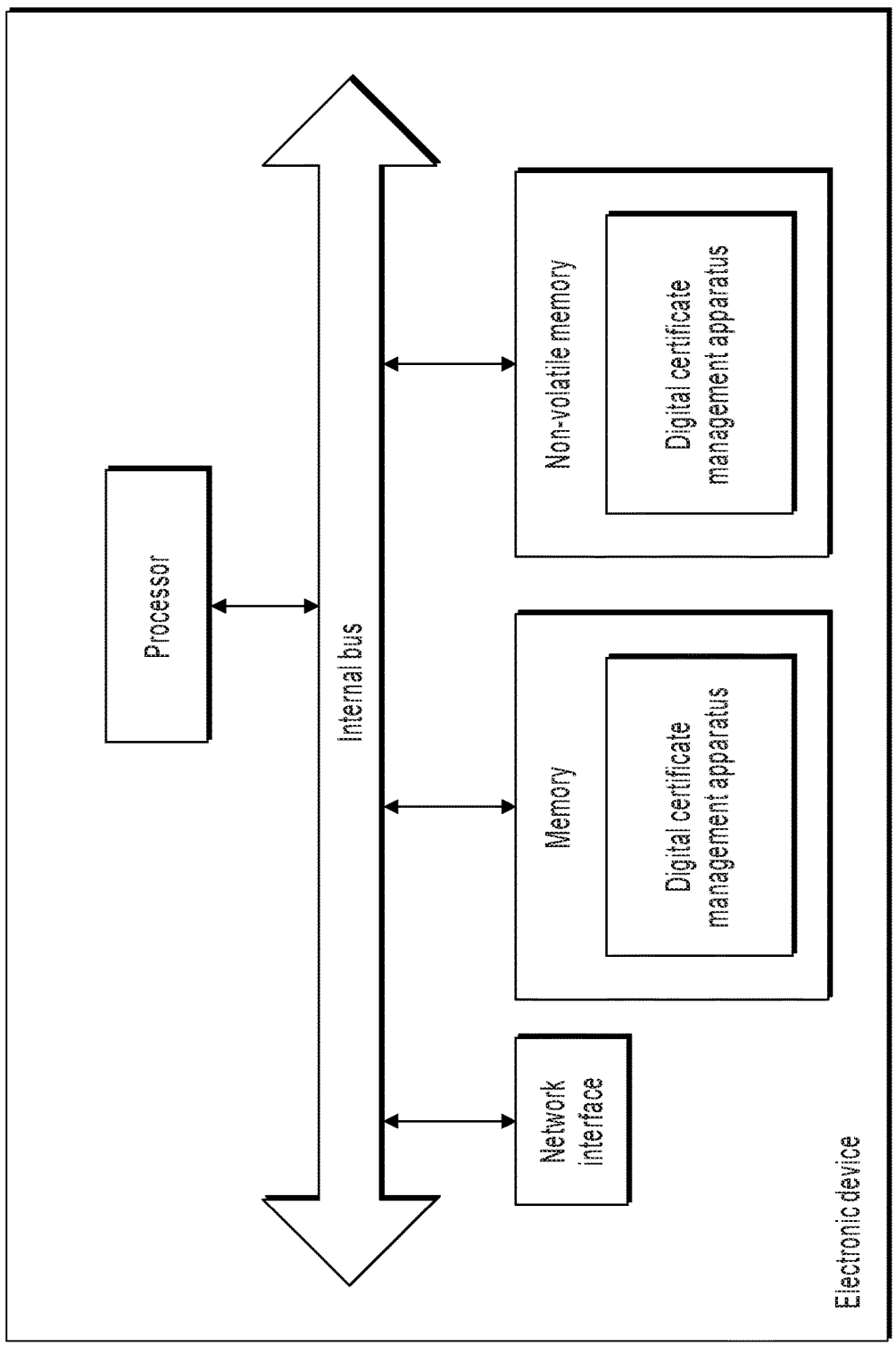
FIG. 12 is a schematic structural diagram illustrating an electronic device, according to Implementation 9 of the present application.

FIG. 12 is a schematic structural diagram illustrating an electronic device, according to Implementation 9 of the present application. Referring to FIG. 12, the electronic device includes a processor, an internal bus, a network interface, a memory, and a non-volatile memory, and certainly can further include hardware needed by another service. The processor reads a corresponding computer program from the non-volatile memory to the memory, and then runs the computer program to form the digital certificate management apparatus at a logical level. Certainly, in addition to a software implementation, the present application does not exclude another implementation, for example, a logic device or a combination of hardware and software. In other words, an execution body of the following processing procedure is not limited to logical units, and can also be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of indication, in FIG. 12, the bus is indicated by using only one double-headed arrow. However, it does not mean that there is only one bus or only one type of bus.

The memory is configured to store a program. Specifically, the program can include program code, and the program code includes a computer operation instruction. The memory can include a read-only memory and a random access memory, and provides an instruction and data for the processor. The memory can include a high-speed random access memory (RAM), and can further include a non-volatile memory (non-volatile memory) such as at least one magnetic disk memory.

The processor is configured to execute the program stored in the memory, and specifically perform the following operations: receiving a second transaction request sent by a certificate authority (CA), where the second transaction request is used for requesting to write a certificate revocation list into a blockchain, and the certificate revocation list is used for recording a revoked digital certificate; determining a consensus result of consensus verification performed by the blockchain on the certificate revocation list; and responding to or rejecting the second transaction request based on the consensus result.

The previous method performed by the digital certificate management apparatus or a master (Master) node and disclosed in the implementations shown in FIG. 5 and FIG. 11 of the present application can be applied to the processor or implemented by the processor. The processor can be an integrated circuit chip and has a signal processing capability. In an implementation process, the steps in the previous methods can be implemented by using an integrated logic circuit of hardware in the processor or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or another programmable logic device, a discrete gate or transistor logic device, or a discrete hardware component; and can implement or perform methods, steps, and logical block diagrams disclosed in the implementations of the present application. The general-purpose processor can be a microprocessor, or the processor can be any conventional processor, etc. Steps of the methods disclosed with reference to the implementations of the present application can be directly executed and completed by using a hardware decoding processor or a combination of hardware and software modules in the decoding processor. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previous methods in combination with hardware of the processor.

The digital certificate management apparatus can further perform the method in FIG. 5 and implement a method performed by the master node.

Implementation 10

Figure 13:
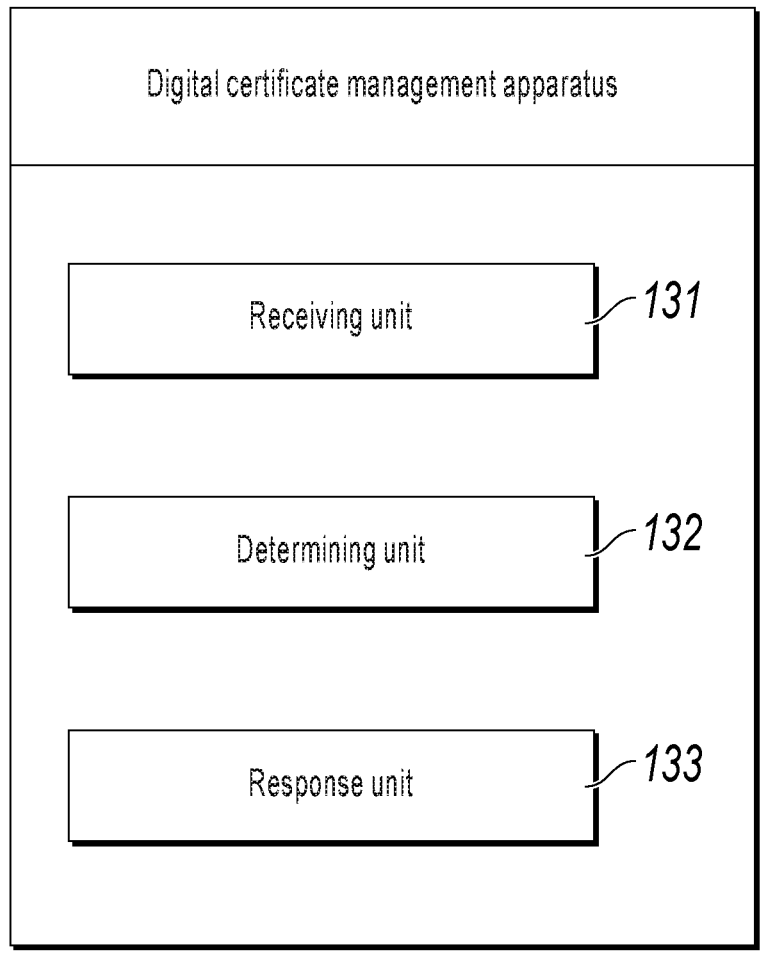
FIG. 13 is a schematic structural diagram illustrating a digital certificate management apparatus, according to Implementation 10 of the present application.

FIG. 13 is a schematic structural diagram illustrating a digital certificate management apparatus, according to Implementation 10 of the present application. Referring to FIG. 13, the apparatus includes a receiving unit 131, a determining unit 132, and a response unit 133.

The receiving unit 131 is configured to receive a fifth transaction request sent by a certificate authority (CA), where the fifth transaction request is used for requesting to write a record of a digital certificate revoked by the CA into a blockchain.

The determining unit 132 is configured to determine a consensus result of consensus verification performed by the blockchain on the record of the revoked digital certificate.

The response unit 133 is configured to respond to or reject the fifth transaction request based on the consensus result.

It should be noted that, a difference from Implementation 8 is that this implementation is applicable to a re-constructed CA system. In the re-constructed system, the CA requests to publish a record of the first revoked certificate to the blockchain. After receiving the request of the CA, the receiving unit 131 forwards the request to the determining unit 132. The determining unit 132 performs consensus verification on the record, and sends a consensus result to the response unit 133. The response unit 133 allows chaining if the response unit 113 learns that the verification succeeds, or refuses chaining if the verification fails.

In addition, it is not difficult to understand that each node in the blockchain constructs a certificate revocation list in a local ledger based on the record of the first revoked certificate to store information about the revoked digital certificate, such as a serial number. Then, respective certificate revocation lists are updated and maintained based on records subsequently written into the blockchain.

It should be noted that, steps such as verifying, based on the certificate revocation list, the permission of the digital certificate of the node in the blockchain that participates in the transaction are similar to the steps in Implementation 8 or the corresponding method implementations. Therefore, details are not described here again. For details, refer to related records in the corresponding implementations.

It can be seen that, in this implementation, the CA publishes the record of the revoked certificate to the blockchain, so that the node constructs the certificate revocation list. Then, when receiving a transaction initiated by a transaction initiation node, the node directly reads the certificate revocation list from the local ledger and verifies the permission of a digital certificate of the transaction initiation node. There is no need to remotely invoke a verification service of the CA. As such, verification costs can be effectively reduced, and the verification efficiency can be improved. Moreover, because the certificate revocation list is stored in the local ledger, no serious consequence occurs even if the CA is hacked.

Implementation 11

Figure 14:
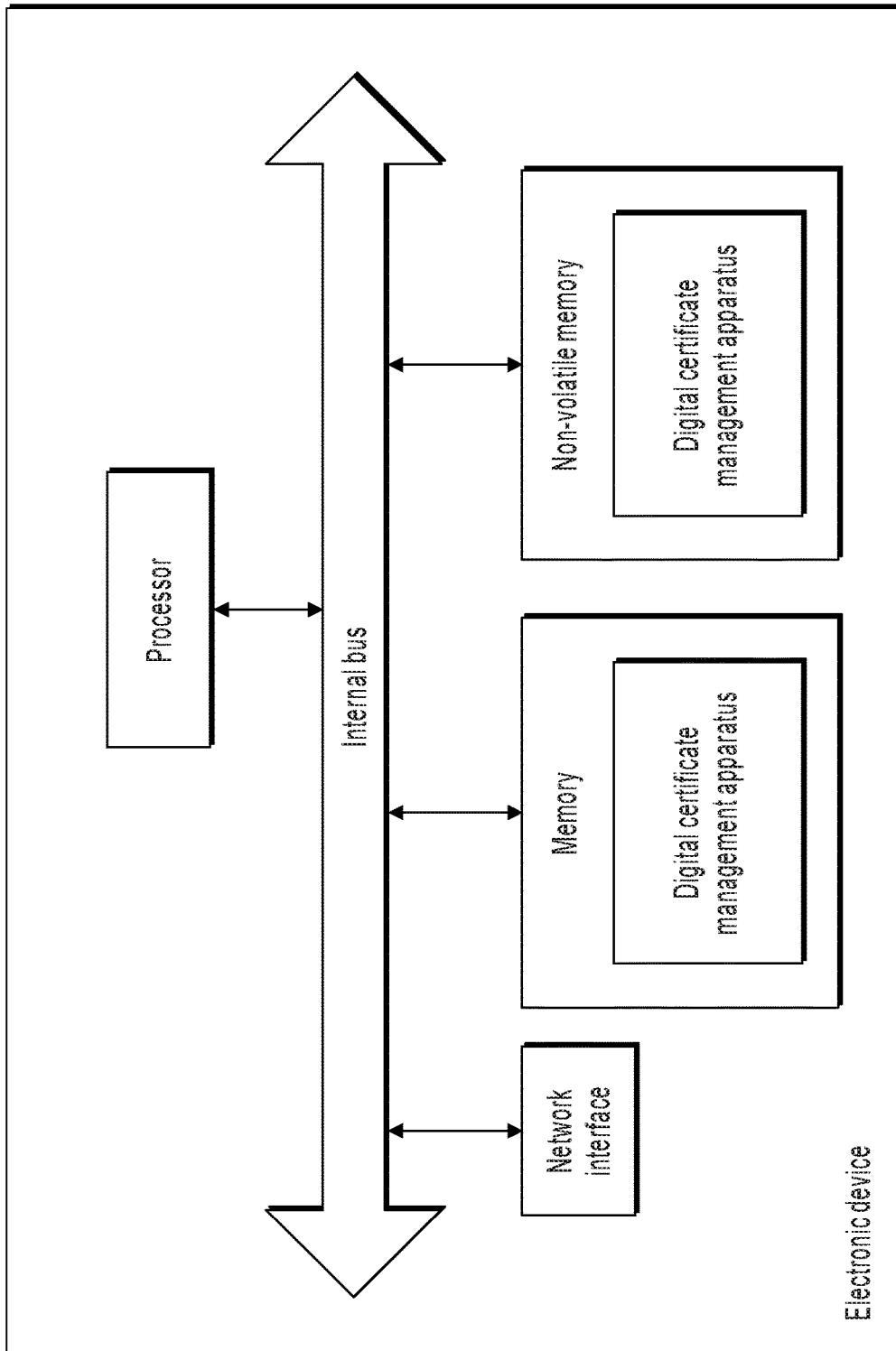
FIG. 14 is a schematic structural diagram illustrating an electronic device, according to Implementation 11 of the present application.

FIG. 14 is a schematic structural diagram illustrating an electronic device, according to Implementation 11 of the present application. Referring to FIG. 14, the electronic device includes a processor, an internal bus, a network interface, a memory, and a non-volatile memory, and certainly can further include hardware needed by another service. The processor reads a corresponding computer program from the non-volatile memory to the memory, and then runs the computer program to form the digital certificate management apparatus at a logical level. Certainly, in addition to a software implementation, the present application does not exclude another implementation, for example, a logic device or a combination of hardware and software. In other words, an execution body of the following processing procedure is not limited to logical units, and can also be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of indication, in FIG. 14, the bus is indicated by using only one double-headed arrow. However, it does not mean that there is only one bus or only one type of bus.

The memory is configured to store a program. Specifically, the program can include program code, and the program code includes a computer operation instruction. The memory can include a read-only memory and a random access memory, and provides an instruction and data for the processor. The memory can include a high-speed random access memory (RAM), and can further include a non-volatile memory (non-volatile memory) such as at least one magnetic disk memory.

The processor is configured to execute the program stored in the memory, and specifically perform the following operations: receiving a fifth transaction request sent by a certificate authority (CA), where the fifth transaction request is used for requesting to write a record of a digital certificate revoked by the CA into a blockchain; determining a consensus result of consensus verification performed by the blockchain on the record of the revoked digital certificate; and responding to or rejecting the fifth transaction request based on the consensus result.

The previous method performed by the digital certificate management apparatus or a master (Master) node and disclosed in the implementations shown in FIG. 7 and FIG. 13 of the present application can be applied to the processor or implemented by the processor. The processor can be an integrated circuit chip and has a signal processing capability. In an implementation process, the steps in the previous methods can be implemented by using an integrated logic circuit of hardware in the processor or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or another programmable logic device, a discrete gate or transistor logic device, or a discrete hardware component; and can implement or perform methods, steps, and logical block diagrams disclosed in the implementations of the present application. The general-purpose processor can be a microprocessor, or the processor can be any conventional processor, etc. Steps of the methods disclosed with reference to the implementations of the present application can be directly executed and completed by using a hardware decoding processor or a combination of hardware and software modules in the decoding processor. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previous methods in combination with hardware of the processor.

The digital certificate management apparatus can further perform the method in FIG. 7 and implement a method performed by the master node.

Implementation 12

Figure 15:
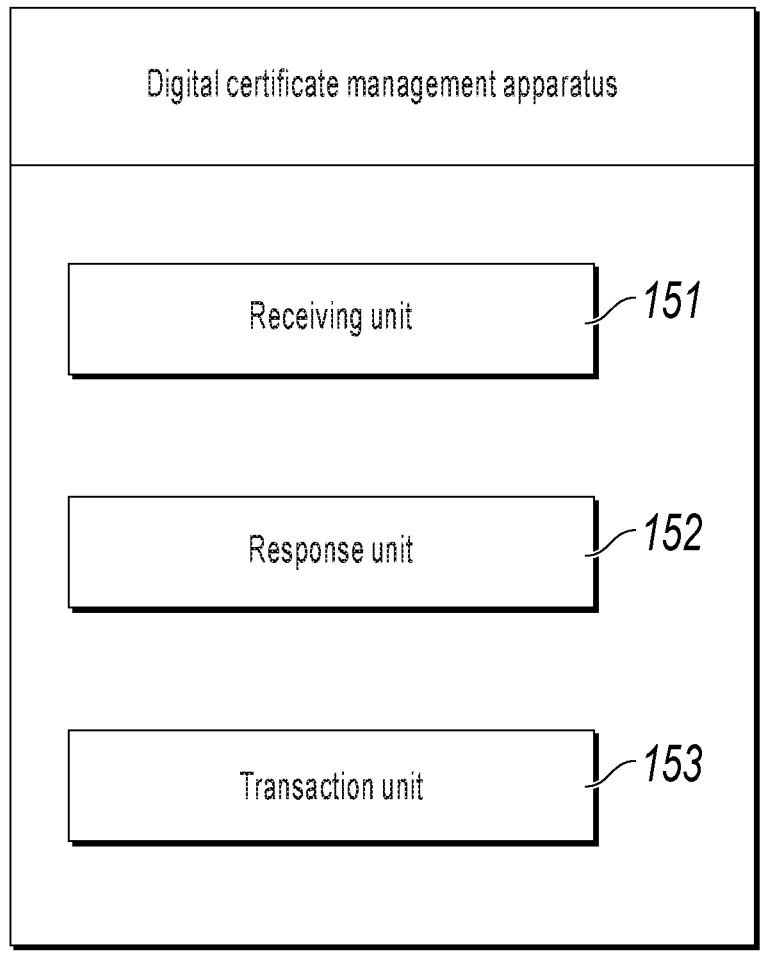
FIG. 15 is a schematic structural diagram illustrating a digital certificate management apparatus, according to Implementation 12 of the present application.

FIG. 15 is a schematic structural diagram illustrating a digital certificate management apparatus, according to Implementation 12 of the present application. Referring to FIG. 15, the apparatus includes a receiving unit 151, a response unit 152, and a transaction unit 153.

The receiving unit 151 is configured to receive an application request sent by a node in a blockchain, where the application request is used for requesting a certificate authority (CA) to issue a digital certificate to the node.

The response unit 152 is configured to issue the digital certificate to the node in response to the application request.

The transaction unit 153 is configured to send a sixth transaction request to the blockchain, where the sixth transaction request is used for requesting to write the digital certificate into the blockchain. Thus, the blockchain performs consensus verification on the digital certificate and responds to or rejects the sixth transaction request based on a consensus result.

It should be noted that, after receiving a digital certificate application request sent by the node, the receiving unit 151 sends the request to the response unit 152. The response unit 152 responds to the request, and requests to chain an issued digital certificate.

It can be seen that, in this implementation of the present application, after issuing the digital certificate to the node, the CA requests the blockchain to chain the digital certificate. The blockchain verifies the validity of the digital certificate and determines whether to chain the digital certificate. Compared with a solution in the existing technology that the CA issues a digital certificate to a node and directly writes the digital certificate into a blockchain for chaining, the CA in this implementation of the present application cannot perform centralized certificate management, certificate storage, and certificate chaining, and can only issue the digital certificate. As such, the risk that the CA is attacked can be reduced, and the CA stability and security can be improved.

Implementation 13

Figure 16:
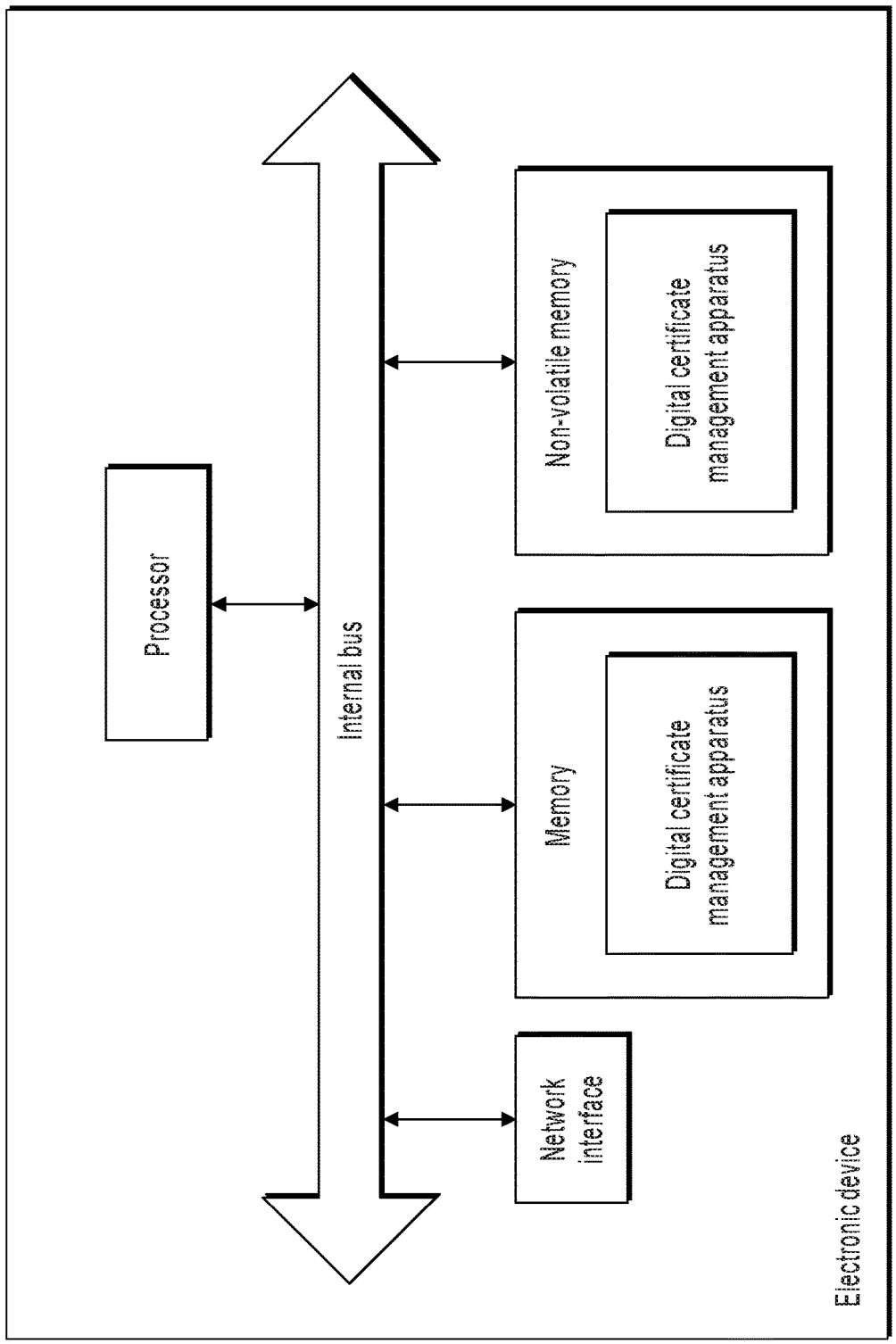
FIG. 16 is a schematic structural diagram illustrating an electronic device, according to Implementation 13 of the present application.

FIG. 16 is a schematic structural diagram illustrating an electronic device, according to Implementation 13 of the present application. Referring to FIG. 16, the electronic device includes a processor, an internal bus, a network interface, a memory, and a non-volatile memory, and certainly can further include hardware needed by another service. The processor reads a corresponding computer program from the non-volatile memory to the memory, and then runs the computer program to form the digital certificate management apparatus at a logical level. Certainly, in addition to a software implementation, the present application does not exclude another implementation, for example, a logic device or a combination of hardware and software.

In other words, an execution body of the following processing procedure is not limited to logical units, and can also be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of indication, in FIG. 16, the bus is indicated by using only one double-headed arrow. However, it does not mean that there is only one bus or only one type of bus.

The memory is configured to store a program. Specifically, the program can include program code, and the program code includes a computer operation instruction. The memory can include a read-only memory and a random access memory, and provides an instruction and data for the processor. The memory can include a high-speed random access memory (RAM), and can further include a non-volatile memory (non-volatile memory) such as at least one magnetic disk memory.

The processor is configured to execute the program stored in the memory, and specifically perform the following operations: receiving an application request sent by a node in a blockchain, where the application request is used for requesting a certificate authority (CA) to issue a digital certificate to the node; issuing the digital certificate to the node in response to the application request; and sending a sixth transaction request to the blockchain, where the sixth transaction request is used for requesting to write the digital certificate into the blockchain. Thus, the blockchain performs consensus verification on the digital certificate and responds to or rejects the sixth transaction request based on a consensus result.

The previous method performed by the digital certificate management apparatus or a master (Master) node and disclosed in the implementations shown in FIG. 8 and FIG. 15 of the present application can be applied to the processor or implemented by the processor. The processor can be an integrated circuit chip and has a signal processing capability. In an implementation process, the steps in the previous methods can be implemented by using an integrated logic circuit of hardware in the processor or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or another programmable logic device, a discrete gate or transistor logic device, or a discrete hardware component; and can implement or perform methods, steps, and logical block diagrams disclosed in the implementations of the present application. The general-purpose processor can be a microprocessor, or the processor can be any conventional processor, etc. Steps of the methods disclosed with reference to the implementations of the present application can be directly executed and completed by using a hardware decoding processor or a combination of hardware and software modules in the decoding processor. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previous methods in combination with hardware of the processor.

The digital certificate management apparatus can further perform the method in FIG. 8 and implement a method performed by the master node.

The apparatus implementation is basically similar to the method implementation, and therefore is described briefly. For related parts, refer to partial descriptions in the method implementation.

It should be noted that, in components of the apparatus of the present disclosure, the components are logically divided based on the functions to be implemented. However, the present disclosure is not limited to this, and the components can be divided or combined as needed.

Implementation 14

Based on the same invention creation, this implementation of the present application further provides a computer readable storage medium. The computer readable storage medium stores one or more programs. When the one or more programs are executed by an electronic device that includes a plurality of application programs, the electronic device can perform the digital certificate management methods provided in Implementations 1, 3, 4, and 5.

Implementation 15

Based on the same invention creation, this implementation of the present application further provides a digital certificate management system, including any one or more of the digital certificate management apparatus provided in the examples that correspond to FIG. 9, FIG. 11, FIG. 13, and FIG. 15.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product implemented on one or more computer-usable storage media (including but not limited to a magnetic disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions can be stored in a computer readable memory that can instruct the computer or any other programmable data processing device to work in a specified way, so that the instructions stored in the computer readable memory generate an artifact that includes an instruction apparatus. The instruction apparatus implements a specified function in one or more processes in the flowcharts and/or in one or more blocks in the block diagrams.

These computer program instructions can be loaded to a computer or another programmable data processing device, so that a series of operations and steps are performed on the computer or another programmable device, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are/is in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical memory, a cassette magnetic tape, a magnetic tape disk memory or another magnetic storage device or any other non-transitory medium, which can be used to store information that can be accessed by the computing device. Based on the definition in this specification, the computer readable medium does not include computer-readable transitory media (transitory media) such as a modulated data signal and carrier.

It should be further noted that, the term "include", "contain", or their any other variant is intended to cover a non-exclusive inclusion, so that a process, a method, a commodity, or a device that includes a series of elements not only includes those elements but also includes other elements that are not expressly listed, or further includes elements inherent to such process, method, commodity, or device. An element described by "includes a . . . " further includes, without more constraints, another identical element in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product implemented on one or more computer-usable storage media (including but not limited to a magnetic disk memory, a CD-ROM, an optical memory, etc.) that include computer-usable program code.

The previous implementations are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims of the present application.

Figure 17:
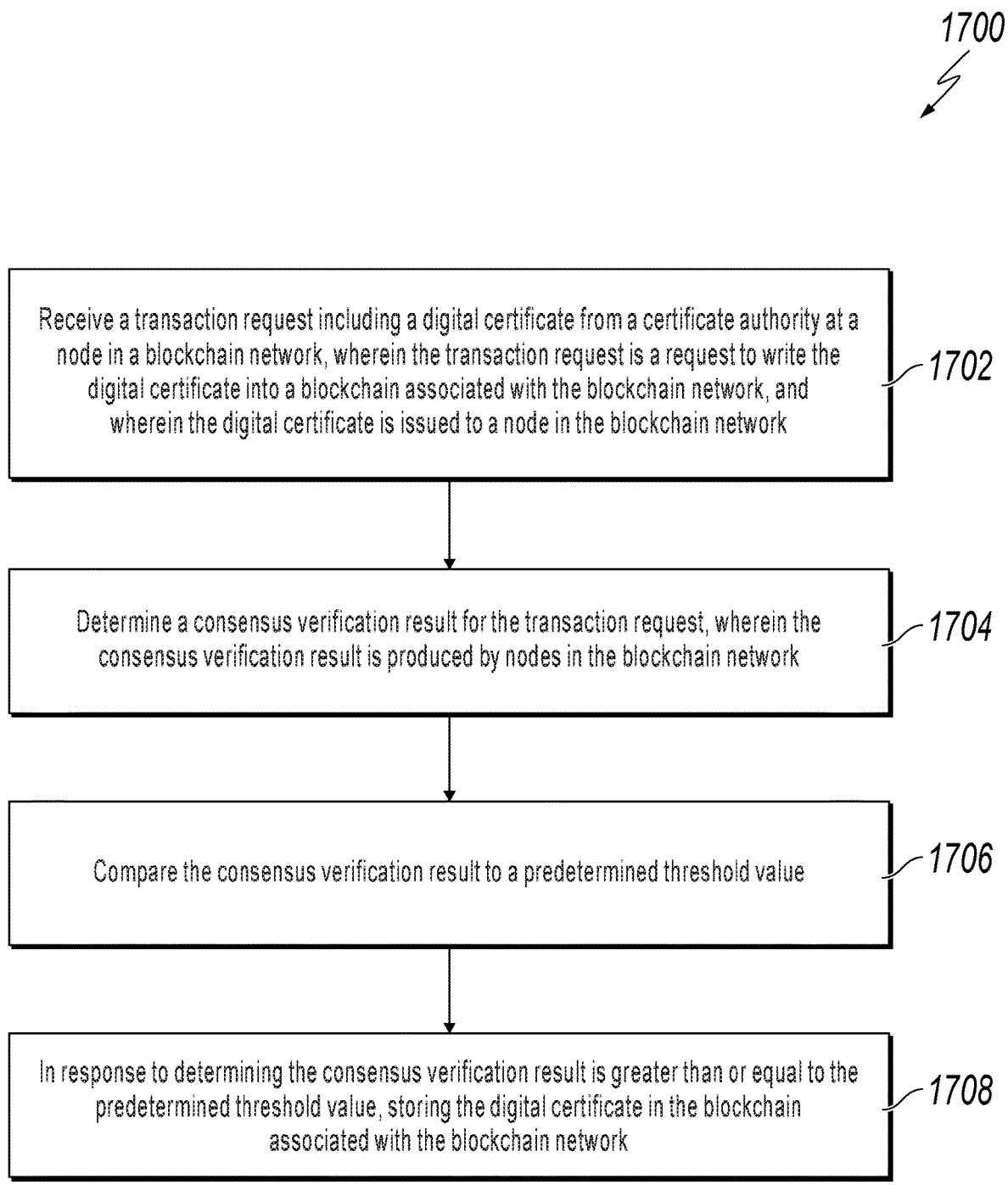
FIG. 17 is a flowchart illustrating an example of a computer-implemented method for securing a digital certificate in a digital certificate management system, according to an implementation of the present disclosure.

FIG. 17 is a flowchart illustrating an example of a computer-implemented method 1700 for securing a digital certificate in a digital certificate management system, according to an implementation of the present disclosure. For clarity of presentation, the description that follows generally describes method 1700 in the context of the other figures in this description. However, it will be understood that method 1700 can be performed, for example, by any system, environment, software, and hardware, or a combination of systems, environments, software, and hardware, as appropriate. In some implementations, various steps of method 1700 can be run in parallel, in combination, in loops, or in any order.

At 1702, a digital certificate management system receives a transaction request including a digital certificate from a certificate authority at a node in a blockchain network, and the transaction request is a request to write the digital certificate into a blockchain associated with the blockchain network, and the digital certificate is issued to a node in the blockchain network. The transaction request from the certificate authority can include asset transfer information indicating a request for a transaction, such as the digital certificate. For example, the asset transfer information can include an identity of a seller or transferor, an identity of a buyer or recipient (e.g., located at the received node). The asset transfer information can also include transaction assets or values that indicate an amount of the transaction information. A time of the transaction was requested, and one or more potential contract clauses. The transaction request can be for a payment between the two parties or a request for payment between two parties, such as two financial institutions.

In some implementations, the transaction request can include a digital certificate. The digital certificate can ensure the two parties talking are the trusted parties. For example, the digital certificate can include a version number, a serial number, a signature type, an issuer information, a validity period, an issuer, an issued public key, a certificate authority digital signature, and other information related to the transaction request. From 1702, method 1700 proceeds to 1704.

At 1704, the digital certificate management system determines a consensus verification result for the transaction request, and the consensus verification result is produced by the nodes in the blockchain network. In some implementations, the digital certificate management system relies on one or more criterion to determine the consensus verification. For example, the one or more criterion can include a verification criterion that includes information related to the digital certificate, such as, for example, an expiration for how long the digital certificate is valid before expiring or whether the serial number corresponding to digital certificate satisfies a requirement between the two parties.

In some implementations, each node in the blockchain network performs consensus verification on the digital certificate sequentially. For example, in the blockchain network, node A performs the first consensus verification and then broadcasts an announcement to another node B of the result of node A's consensus verification and the received transaction request from the certificate authority. This process continues until nodes B through Z each perform a consensus verification on the received transaction request and each node knows every other node's results. Lastly, after each node performs the consensus verification, each node signs the digital certificate to verify to the certificate authority that the consensus verification has completed.

In some implementations, each node in the blockchain network performs consensus verification. In particular, a node, such as node A, parses the transaction request to obtain the digital certificate. If a digital certificate does not exist, the node denies the transaction request from the certificate authority. If the digital certificate exists, the node extracts a local ledger from its memory. The local ledger maintains a record of each of the transactions performed by the node and a certificate revocation list. The certificate revocation list tracks the certificates that are denied access by each of the nodes and the certificate authority. In particular, the node compares the extracted digital certificate with each digital certificate in the certificate revocation list. If the extracted digital certificate matches a digital certificate in the certificate revocation list, then the node refuses the transaction request. If the extracted digital certificate does not match any digital certificate in the certificate revocation list, then the node completes the transaction for that node and broadcasts an announcement of the result and the transaction request. In response to completing the transaction request, the node adds the transaction request to the local ledger in the blockchain. In other implementations, the transaction is not complete until each node in the blockchain network performs consensus verification. From 1704, method 1700 proceeds to 1706.

At 1706, the digital certificate management system compares the consensus verification result to a predetermined threshold value. In response to each node in the blockchain network performing a consensus verification, the digital certificate management system compares a result of the consensus verification to a predetermined threshold value. For example, the digital certificate management system analyzes a number of nodes that participate in the consensus verification whose verification result is succeed. The digital certificate management system also analyzes a number of nodes that participate in the consensus verification whose verification result is failed. The digital certification management system compares the number of nodes that result in successful consensus verification to a predetermined threshold. If the number is greater than the predetermined threshold, then the digital certificate management system stores the digital certificate. From 1706, method 1700 proceeds to 1708.

At 1708, in response to the digital certificate management system determining the consensus verification result is greater than or equal to the predetermined threshold value, the digital certificate management system stores the digital certificate in the blockchain associated with the blockchain network. In particular, the digital certificate management system (the blockchain network of nodes) stores the digital certificate and the data identifying the transaction request from the certificate authority in response to the result of the consensus verification from the digital certificate management system being greater than or equal to the predetermined threshold value. The digital certificate management system can store the digital certificate and the data identifying the transaction request in a local ledger or blockchain of the blockchain network. Each of the nodes can access its own node to read and write to the local ledger. Additionally, each node should have the same local ledger or blockchain in the digital local management system. The digital certificate management system logs a date and time for the execution of the transaction request. The digital certificate management system provides an indication to the certificate authority that the transaction has executed. After 1708, method 1700 stops.

The features of the present application seek to remove issues with a faulty certificate authority. For example, by receiving a transaction request sent by a certificate authority, and the transaction request includes transaction data and a digital certificate for writing the digital certificate into a blockchain in a blockchain network; determining a consensus verification performed by the blockchain network on the transaction request and in response to determining a result of the consensus verification is greater than a predetermined threshold, writing the digital certificate into the blockchain of the blockchain network and executing the transaction request from the certificate authority. By performing the consensus verification at the digital certificate management system, the transaction can still be executed even if the certificate authority is faulty, hacked, or maliciously used to randomly issue a digital certificate. In result, the blockchain network can be remove a large security risk from the faulty certificate authority so as to improve the security of the blockchain in the blockchain network.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving a transaction request including a digital certificate from a certificate authority at a node in a blockchain network, wherein the transaction request is a request to write the digital certificate into a blockchain associated with the blockchain network, and wherein the digital certificate is issued to a node in the blockchain network;
   determining a consensus verification result for the transaction request, wherein the consensus verification result is produced by nodes in the blockchain network;
   comparing the consensus verification result to a predetermined threshold value; and
   in response to determining the consensus verification result is greater than or equal to the predetermined threshold value, storing the digital certificate in the blockchain associated with the blockchain network.

2. The computer-implemented method of claim 1, wherein the transaction request comprises asset transfer information and the digital certificate.

3. The computer-implemented method of claim 1, wherein determining a consensus verification result further comprises:
   determining the consensus verification by each node in the blockchain network sequentially; and
   in response to a node determining the consensus verification, broadcasting, by the node, an announcement of completing the consensus verification to notify another node of the transaction request from the certificate authority and a result of the consensus verification of the node.

4. The computer-implemented method of claim 3, wherein the consensus verification further comprises:
   extracting a certificate revocation list from a local ledger for a node;
   comparing the digital certificate from the transaction request at the node with each revoked digital certificate recorded in the certificate revocation list;
   in response to determining that the digital certificate does not match with each of the revoked digital certificates in the certificate revocation list, providing an indication that the consensus verification passed at the node; and
   storing the digital certificate extracted from the transaction request in the local ledger for the node.

5. The computer-implemented method of claim 1, wherein determining the consensus verification result further comprises determining a consensus verification by the blockchain network of the transaction request over a predefined consensus verification duration.

6. The computer-implemented method of claim 1, further comprising:
   determining a number of first nodes that indicate a success as a result from a consensus verification
   determining a number of second nodes that indicate a failure as a result from the consensus verification; and
   determining a consensus result based on the number of first nodes and the number of second nodes.

7. The computer-implemented method of claim 1, wherein the transaction request is first transaction request, the consensus verification result is a first consensus verification result, and the method further comprises:
   receiving a second transaction request including a certificate revocation list, wherein the second transaction request is a request to record the certificate revocation list in the blockchain;
   determining a second consensus verification result for the second transaction request;
   comparing the second consensus verification result to the predetermined threshold value; and
   in response to determining the second consensus verification result is greater than or equal to the predetermined threshold value, writing the certificate revocation list into the blockchain.

8. The computer-implemented method of claim 1, further comprising:
   receiving a third transaction request, wherein the third transaction request is a request to write an edit to a certificate revocation list into the blockchain;
   determining a third consensus verification result for the third transaction request;
   comparing the third consensus verification result to the predetermined threshold value; and
   in response to determining the third consensus verification result is greater than or equal to the predetermined threshold value, writing the edit of the certificate revocation list into the blockchain.

9. A non-transitory, computer-readable medium storing one or more instructions executable by a computer system to perform operations comprising:
   receiving a transaction request including a digital certificate from a certificate authority at a node in a blockchain network, wherein the transaction request is a request to write the digital certificate into a blockchain associated with the blockchain network, and wherein the digital certificate is issued to a node in the blockchain network;

determining a consensus verification result for the transaction request, wherein the consensus verification result is produced by nodes in the blockchain network;

comparing the consensus verification result to a predetermined threshold value; and in response to determining the consensus verification result is greater than or equal to the predetermined threshold value, storing the digital certificate in the blockchain associated with the blockchain network.

10. The non-transitory, computer-readable medium of claim 9, wherein the transaction request comprises asset transfer information and the digital certificate.

11. The non-transitory, computer-readable medium of claim 9, wherein determining a consensus verification result further comprises:
    determining the consensus verification by each node in the blockchain network sequentially; and
    in response to a node determining the consensus verification, broadcasting, by the node, an announcement of completing the consensus verification to notify another node of the transaction request from the certificate authority and a result of the consensus verification of the node.

12. The non-transitory, computer-readable medium of claim 11, wherein the consensus verification further comprises:
    extracting a certificate revocation list from a local ledger for a node;
    comparing the digital certificate from the transaction request at the node with each revoked digital certificate recorded in the certificate revocation list;
    in response to determining that the digital certificate does not match with each of the revoked digital certificates in the certificate revocation list, providing an indication that the consensus verification passed at the node; and
    storing the digital certificate extracted from the transaction request in the local ledger for the node.

13. The non-transitory, computer-readable medium of claim 9, wherein determining the consensus verification result further comprises determining a consensus verification by the blockchain network of the transaction request over a predefined consensus verification duration.

14. The non-transitory, computer-readable medium of claim 9, wherein the transaction request is first transaction request, the consensus verification result is a first consensus verification result, and the operations further comprises:
    receiving a second transaction request including a certificate revocation list, wherein the second transaction request is a request to record the certificate revocation list in the blockchain;
    determining a second consensus verification result for the second transaction request;
    comparing the second consensus verification result to the predetermined threshold value; and in response to determining the second consensus verification result is greater than or equal to the predetermined threshold value, writing the certificate revocation list into the blockchain.

15. The non-transitory, computer-readable medium of claim 9, further comprising:
    receiving a third transaction request, wherein the third transaction request is a request to write an edit to a certificate revocation list into the blockchain;
    determining a third consensus verification result for the third transaction request;
    comparing the third consensus verification result to the predetermined threshold value; and
    in response to determining the third consensus verification result is greater than or equal to the predetermined threshold value, writing the edit of the certificate revocation list into the blockchain.

16. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    receiving a transaction request including a digital certificate from a certificate authority at a node in a blockchain network, wherein the transaction request is a request to write the digital certificate into a blockchain associated with the blockchain network, and wherein the digital certificate is issued to a node in the blockchain network;
    determining a consensus verification result for the transaction request, wherein the consensus verification result is produced by nodes in the blockchain network;
    comparing the consensus verification result to a predetermined threshold value; and
    in response to determining the consensus verification result is greater than or equal to the predetermined threshold value, storing the digital certificate in the blockchain associated with the blockchain network.

17. The computer-implemented system of claim 16, wherein the transaction request comprises asset transfer information and the digital certificate.

18. The computer-implemented system of claim 16, wherein determining a consensus verification result further comprises:
    determining the consensus verification by each node in the blockchain network sequentially; and
    in response to a node determining the consensus verification, broadcasting, by the node, an announcement of completing the consensus verification to notify another node of the transaction request from the certificate authority and a result of the consensus verification of the node.

19. The computer-implemented system of claim 18, wherein the consensus verification further comprises:
    extracting a certificate revocation list from a local ledger for a node;
    comparing the digital certificate from the transaction request at the node with each revoked digital certificate recorded in the certificate revocation list;
    in response to determining that the digital certificate does not match with each of the revoked digital certificates in the certificate revocation list, providing an indication that the consensus verification passed at the node; and
    storing the digital certificate extracted from the transaction request in the local ledger for the node.

20. The computer-implemented system of claim 16, wherein determining the consensus verification result further comprises determining a consensus verification by the blockchain network of the transaction request over a predefined consensus verification duration.

* * * * *